US011970359B2

(12) United States Patent
Tsuda et al.

(10) Patent No.: US 11,970,359 B2
(45) Date of Patent: Apr. 30, 2024

(54) TECHNIQUE FOR SWITCHING ROTATIONAL SPEED OF PLURALITY OF ROTATING MEMBERS

(71) Applicant: CANON KABUSHIKI KAISHA, Tokyo (JP)

(72) Inventors: Satoshi Tsuda, Shizuoka (JP); Takashi Yano, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 159 days.

(21) Appl. No.: 17/669,678

(22) Filed: Feb. 11, 2022

(65) Prior Publication Data

US 2022/0258994 A1 Aug. 18, 2022

(30) Foreign Application Priority Data

Feb. 17, 2021 (JP) ................................ 2021-023691

(51) Int. Cl.
B65H 5/06 (2006.01)
B65H 7/02 (2006.01)
G03G 15/00 (2006.01)

(52) U.S. Cl.
CPC ................ B65H 7/02 (2013.01); B65H 5/06 (2013.01); G03G 15/6529 (2013.01);
(Continued)

(58) Field of Classification Search
CPC ........ B65H 5/06; B65H 7/02; B65H 2403/80; B65H 2403/82; B65H 2403/724; G03G 15/6529
(Continued)

(56) References Cited

U.S. PATENT DOCUMENTS 5,769,408 A 6/1998 Selak et al.
6,530,569 B2 3/2003 Yamagishi
(Continued)

FOREIGN PATENT DOCUMENTS

JP 2002167076 A 6/2002
JP 2009132504 A 6/2009
(Continued)

OTHER PUBLICATIONS

Espacenet machine translation of JP2009132505A; https://translationportal.epo.org/emtp/translate/?ACTION=description-retrieval&COUNTRY=JP&ENGINE=google&FORMAT=docdb&KIND=A&LOCALE=en_EP&NUMBER=2009132505&OPS=ops.epo.org/3.2&SRCLANG=ja&TRGLANG=en (Year: 2009).*

(Continued)

Primary Examiner — Leslie A Nicholson, III
(74) Attorney, Agent, or Firm — ROSSI, KIMMS & McDOWELL LLP

(57) ABSTRACT

A sheet conveying apparatus may comprise a first conveying roller configured to convey a sheet and a second conveying roller disposed on a downstream side of the first conveying roller in a conveyance direction of the sheet. In a case where the second conveying roller rotates at a first speed by a driving force being transmitted to the second conveying roller, the first conveying roller rotates by being driven with respect to the second conveying roller. In a case where the second conveying roller rotates at a second speed faster than the first speed by the driving force being transmitted to the second conveying roller, the first conveying roller rotates at the second speed.

15 Claims, 13 Drawing Sheets

(52) U.S. Cl.
CPC .... *B65H 2403/51* (2013.01); *B65H 2403/724* (2013.01); *B65H 2403/82* (2013.01)

(58) Field of Classification Search
USPC .......................................................... 271/270
See application file for complete search history.

(56) References Cited

U.S. PATENT DOCUMENTS

| | | | | |
|---|---|---|---|---|
| 9,511,972 | B1 * | 12/2016 | Ouchi | H04N 1/0057 |
| 9,561,924 | B2 * | 2/2017 | Azeta | B65H 85/00 |
| 9,864,316 | B2 * | 1/2018 | Ouchi | B65H 9/004 |
| 10,131,517 | B2 * | 11/2018 | Iwama | G03G 21/1604 |
| 10,200,553 | B2 | 2/2019 | Umi | |
| 10,246,282 | B2 * | 4/2019 | Miki | F16H 3/093 |
| 10,663,906 | B2 * | 5/2020 | Suzuki | G03G 15/70 |
| 2008/0260444 | A1 * | 10/2008 | Ikeda | G03G 15/6564 399/388 |
| 2014/0175731 | A1 * | 6/2014 | Okawa | B65H 5/26 271/3.18 |
| 2015/0261160 | A1 * | 9/2015 | Sato | B65H 7/02 271/258.03 |
| 2016/0090258 | A1 * | 3/2016 | Sano | B65H 3/0669 271/225 |
| 2017/0087877 | A1 * | 3/2017 | Nishimura | B65H 5/062 |
| 2017/0090388 | A1 * | 3/2017 | Ouchi | B65H 3/0684 |
| 2017/0297839 | A1 | 10/2017 | Miki | |

FOREIGN PATENT DOCUMENTS

| | | |
|---|---|---|
| JP | 2009132505 A | 6/2009 |
| JP | 2018100141 A | 6/2018 |

OTHER PUBLICATIONS

Extended European search report issued in European Appln No. 22153828.3 dated Jul. 15, 2022.

* cited by examiner

| | STATE OF PAPER FEED CLUTCH | |
|---|---|---|
| | ON (TRANSMISSIVE STATE) | OFF (DISCONNECTED STATE) |
| PAPER FEED ROLLER GROUP | SECOND SPEED | STOPPED/DRIVEN |
| INTERMEDIATE CONVEYING ROLLER | SECOND SPEED | FIRST SPEED |

PAPER FEED CLUTCH: OFF

PAPER FEED CLUTCH: ON

PAPER FEED CLUTCH: OFF

PAPER FEED CLUTCH: OFF

PAPER FEED CLUTCH: OFF
REGISTRATION CLUTCH: OFF

PAPER FEED CLUTCH: ON
REGISTRATION CLUTCH: OFF

PAPER FEED CLUTCH: ON
REGISTRATION CLUTCH: ON

PAPER FEED CLUTCH: OFF
REGISTRATION CLUTCH: OFF

TECHNIQUE FOR SWITCHING ROTATIONAL SPEED OF PLURALITY OF ROTATING MEMBERS

BACKGROUND OF THE INVENTION

Field of the Invention

The present invention relates to a technique for switching a rotational speed of a plurality of rotating members.

Description of the Related Art

Image forming apparatuses form an image using toner or ink or the like on a sheet conveyed by a sheet conveying apparatus. In order to efficiently form images continuously for multiple sheets, it is required to maintain a constant distance between a preceding sheet and a succeeding sheet. According to Japanese Patent Laid-Open No. 2009-132505, it has been proposed to maintain a constant distance between the preceding sheet and the subsequent sheet by adjusting a conveying speed of the subsequent sheet.

Japanese Patent Laid-Open No. 2009-132505 requires two electromagnetic clutches to switch a rotational speed of two rollers. Therefore, manufacturing cost of the sheet conveying apparatus has risen.

SUMMARY OF THE INVENTION

The present invention provides a sheet conveying apparatus comprising: a first conveying roller configured to convey a sheet; and a second conveying roller disposed on a downstream side of the first conveying roller in a conveyance direction of the sheet; wherein in a case where the second conveying roller rotates at a first speed by a driving force being transmitted to the second conveying roller, the first conveying roller rotates by being driven with respect to the second conveying roller, and in a case where the second conveying roller rotates at a second speed faster than the first speed by the driving force being transmitted to the second conveying roller, the first conveying roller rotates at the second speed.

Further features of the present invention will become apparent from the following description of exemplary embodiments (with reference to the attached drawings).

DESCRIPTION OF THE EMBODIMENTS

Figure 1:
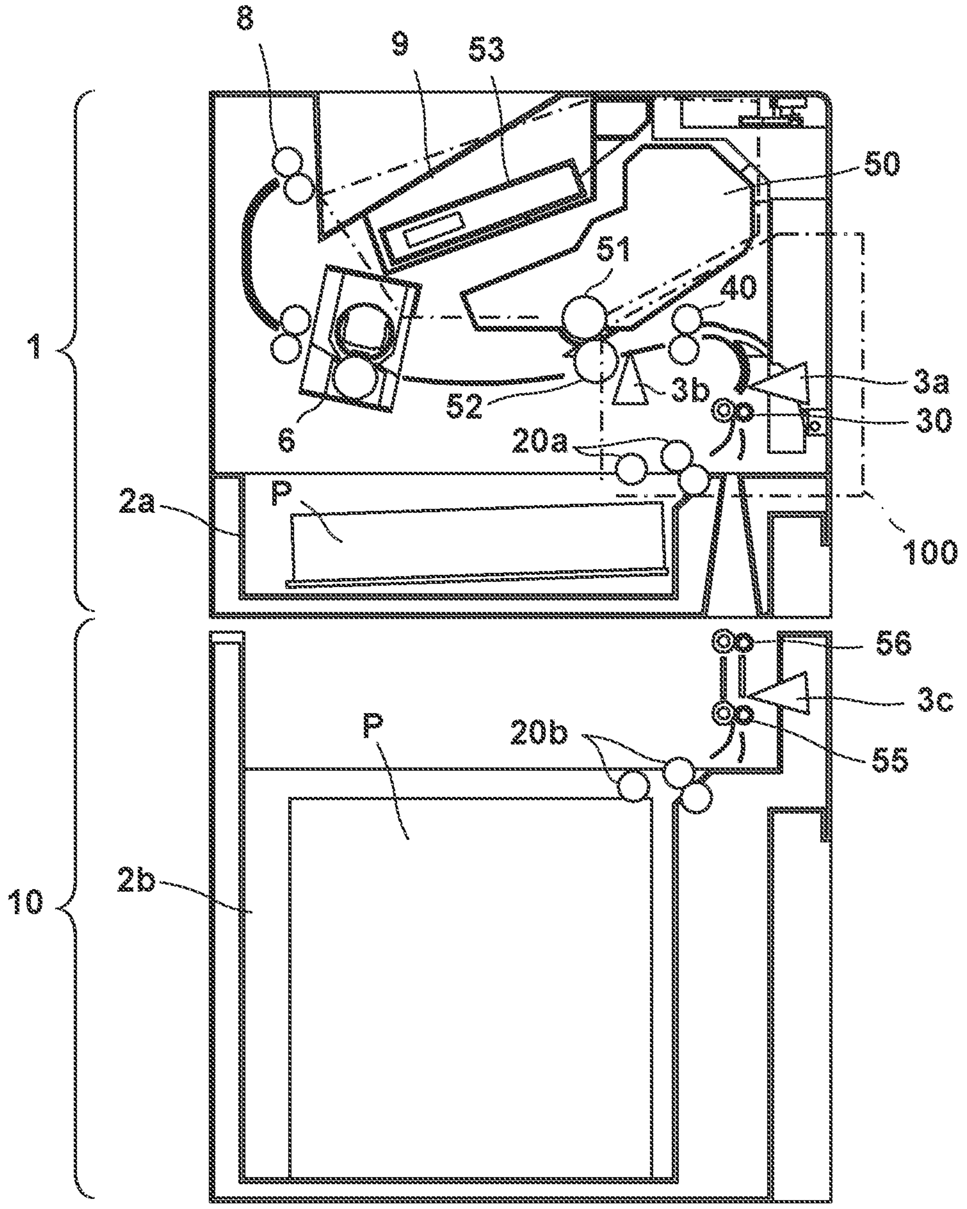
FIG. 1 is a view explaining an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Image Forming Apparatus

Lowercase letters may be appended to the end of the reference numerals when distinguishing between a plurality of the same or similar components, but the letters may be omitted when matters in common with the plurality of components are described.

FIG. 1 illustrates an electrophotographic image forming apparatus 1. An electrophotographic method is an image forming method that includes charging of a photoreceptor, formation of an electrostatic latent image, development of the electrostatic latent image, transfer of a toner image, and fixing of the toner image. Other image forming methods, such as an inkjet printing method, may be employed instead of the electrophotographic method.

A sheet cassette 2*a* is a container for accommodating or storing a plurality of sheets P. A paper feed roller group 20*a* includes a plurality of rollers for picking up a sheet P housed in the sheet cassette 2*a* and feeding the sheet P to a conveying path. In the conveyance direction of the sheet P, an intermediate conveying roller pair 30 is provided on the downstream side of the paper feed roller group 20*a*. The intermediate conveying roller pair 30 further conveys the sheet P fed from the paper feed roller group 20*a* or an optional paper feed apparatus 10 to the downstream side. A registration roller pair 40 is provided on the downstream side of the intermediate conveying roller pair 30 in the conveyance direction. The registration roller pair 40 is a pair of conveying rollers for conveying the sheet P to a transfer unit. Incidentally, a sheet sensor 3*a* is provided between the intermediate conveying roller pair 30 and the registration roller pair 40 in the conveying path. The timing at which the sheet sensor 3*a* detects the leading end of the sheet P is utilized for controlling a change in the conveying speed of the sheet P. For example, this may be utilized to determine the timing of decelerating from a second conveying speed to a first conveying speed. Another sheet sensor 3*b* is provided between the registration roller pair 40 and a transfer roller 52 in the conveying path. The timing at which the sheet sensor 3*b* detects the leading end of the sheet P is used as a timing of starting the writing of an image to a photosensitive drum 51 in an image forming unit 50. Thus, the toner image is transferred to an ideal position on the sheet P.

A laser scanner 53 is an optical scanning apparatus or an exposure apparatus that irradiates the photosensitive drum 51 with a laser beam corresponding to an image signal in response to an image writing timing to form an electrostatic latent image. The image forming unit 50 develops an electrostatic latent image on the photosensitive drum 51 with toner to form a toner image. The photosensitive drum 51 rotates to convey the toner image to the transfer unit. In the transfer unit, the transfer roller 52 transfers the toner image from the photosensitive drum 51 to the sheet P. A fixing apparatus 6 applies heat and pressure to the sheet P and the toner image to fix the toner image on the sheet P. A paper ejection roller 8 ejects the sheet P to an ejection unit 9.

Optional Paper Feed Apparatus

The optional paper feed apparatus 10 can be attached and detached to and from the image forming apparatus 1 and has a sheet cassette 2*b* that can accommodate more sheets P. A paper feed roller group 20*b* includes a plurality of rollers for picking up a sheet P housed in the sheet cassette 2*b* and feeding the sheet P to a conveying path. In the conveyance direction of the sheet P, a conveying roller pair 55 is provided on the downstream side of the paper feed roller group 20*b*. The conveying roller pair 55 further conveys the sheet P fed from the paper feed roller group 20*b* to the downstream side. An outlet roller pair 56 is provided on the downstream side of the conveying roller pair 55 in the conveyance direction. The outlet roller pair 56 is a pair of conveying rollers that conveys the sheet P and passes the sheet P to the intermediate conveying roller pair 30. A sheet sensor 3*c* is provided between the conveying roller pair 55 and the outlet roller pair 56 in the conveying path. The timing at which the sheet sensor 3*c* detects the leading end of the sheet P may be utilized for adjusting the conveying speed.

<Sheet Conveying Apparatus>

Figure 2:
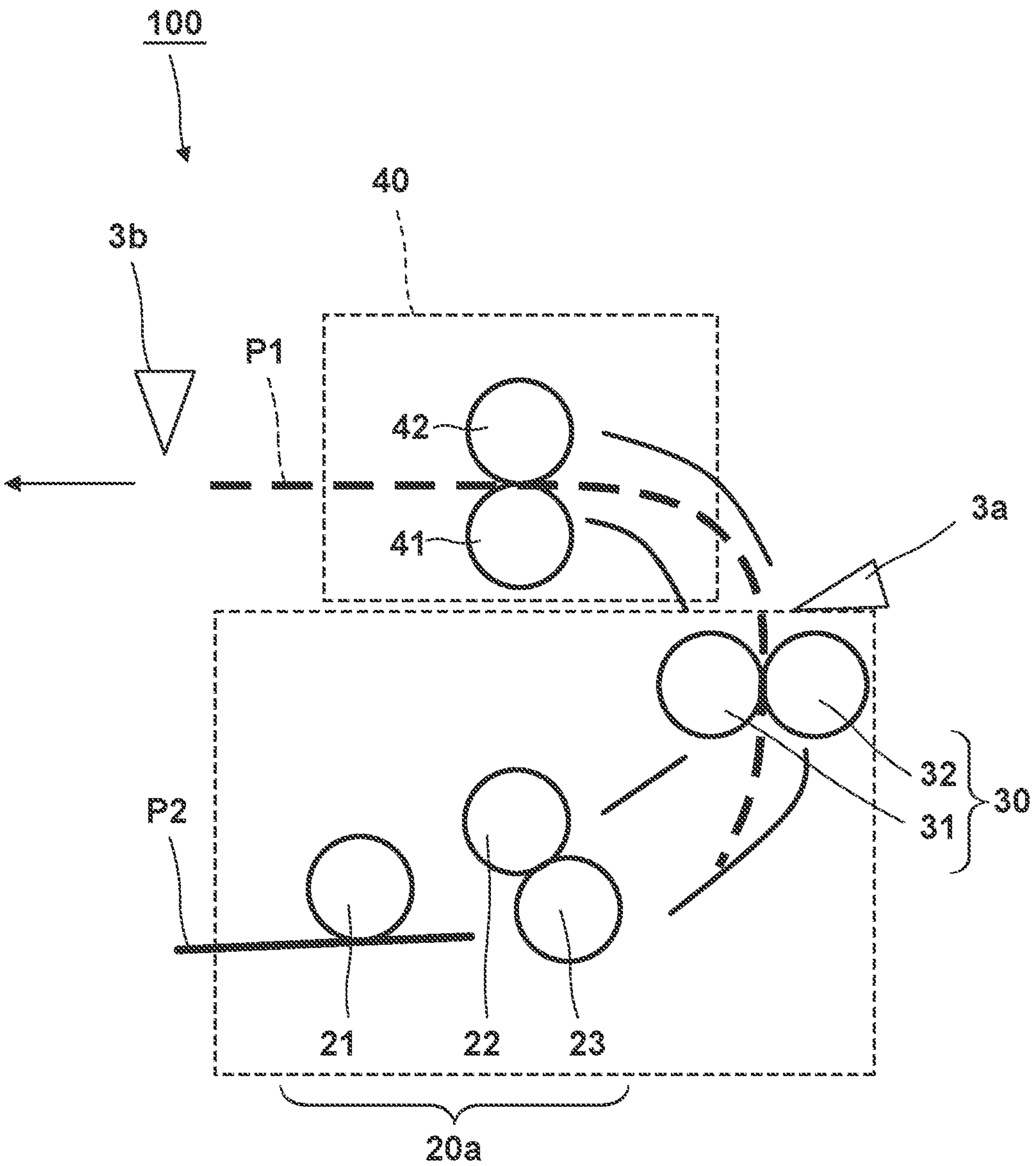
FIG. 2 is a view explaining a sheet conveying apparatus.

As illustrated in FIG. 2, the paper feed roller group 20*a* of a sheet conveying apparatus 100 includes a pickup roller 21, a feed roller 22, and a separation roller 23. The pickup roller 21 rotates when it contacts the sheet P positioned at the top of the sheet bundle accommodated in the sheet cassette 2*a* and feeds the sheet P to the downstream side. The feed roller 22 conveys the sheet P transferred from the pickup roller 21 further downstream. Incidentally, the pickup roller 21 and the feed roller 22 are connected via a chain of drives. A rotational force (driving force) generated by a drive source such as a motor is inputted to the feed roller 22 by the chain of drives. Further, the driving force inputted to the feed roller 22 is inputted to the pickup roller 21 by the chain of drives. Thus, the pickup roller 21 and the feed roller 22 rotate in conjunction. The chain of drives is a driving force transmission mechanism having a plurality of gears, a rotational shaft, a clutch, and the like. The separation roller 23 is a separation mechanism for separating one sheet P and the remaining sheets P among the plurality of sheets P that are brought out together by the pickup roller 21. Thus, only one sheet P is conveyed to the downstream side. The separation roller 23 may, for example, incorporate a torque limiter that helps separate the sheet P.

The intermediate conveying roller pair 30 includes an intermediate conveying roller 31 which rotates by receiving a driving force, and an intermediate conveying roller 32 which rotates by being driven by the intermediate conveying roller 31. The rotational speed of the intermediate conveying roller 31 is selected to be either a first speed or a second speed, as will be described later. In this specification, the rotational speed of a roller is the movement speed of the roller surface, and may be a peripheral speed or a conveying speed. For example, if the radius of a roller is r [m] and the angular speed of the roller is w [rad/sec], the peripheral speed v [m/sec] is the product of the radius r and the angular speed w. The registration roller pair 40 includes a registration roller 41 which rotates by receiving a driving force, and a registration roller 42 which rotates by being driven by the registration roller 41.

<Chain of Drives>

Figure 3:
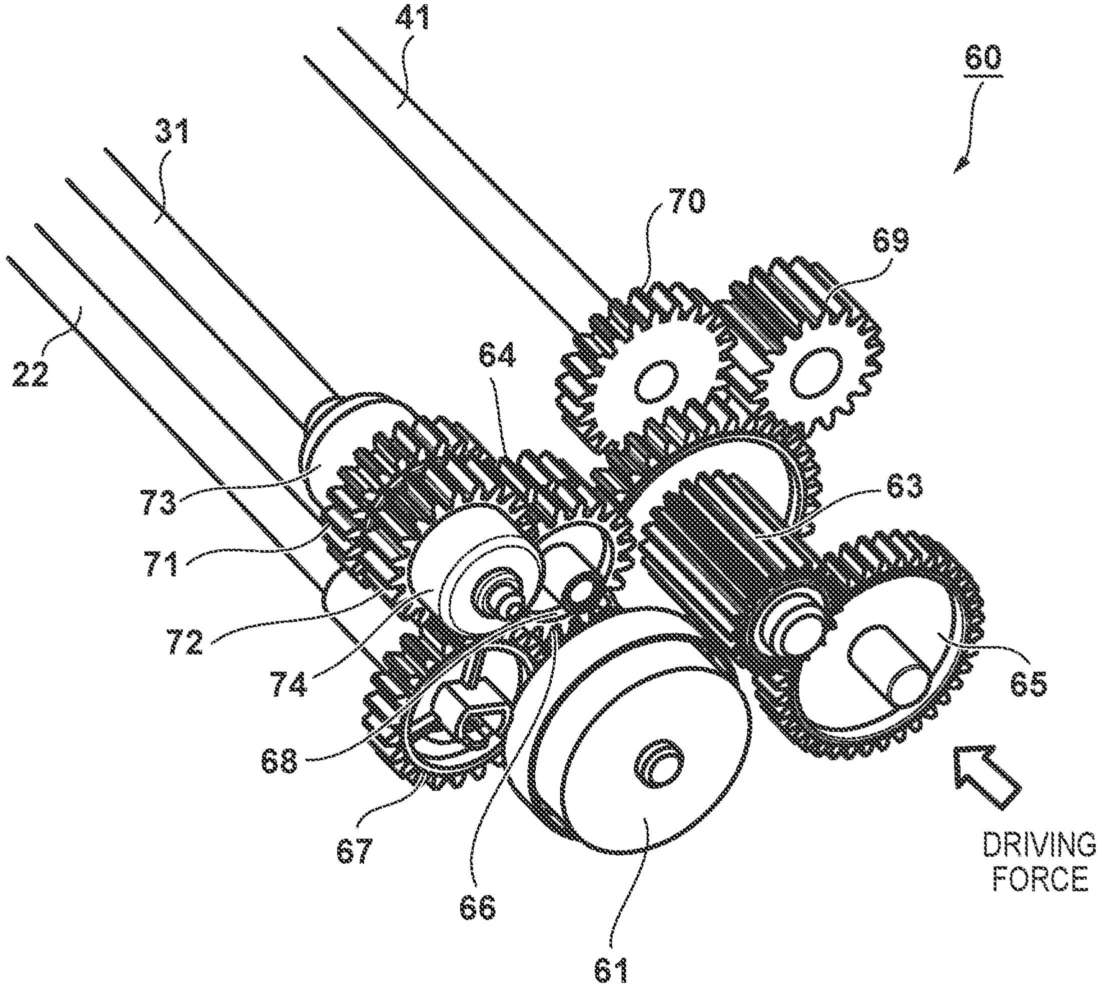
FIG. 3 is a view explaining a chain of drives.
Figures 4, 5:
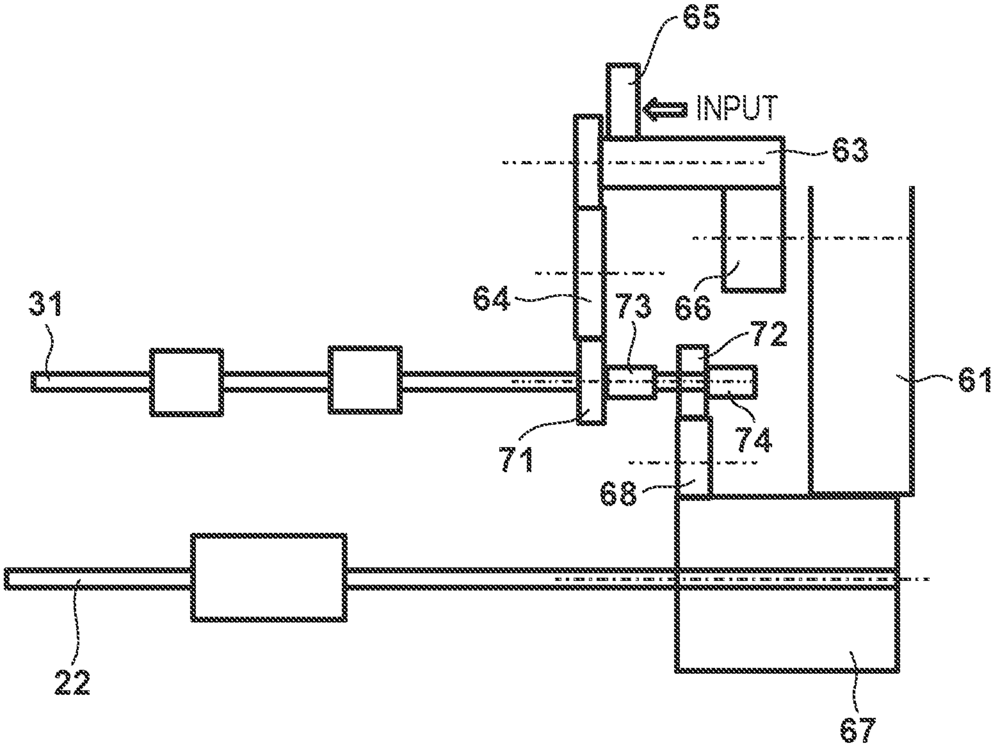
FIG. 4 is a view explaining the chain of drives.
FIG. 5 is a table explaining the relationship between a state and speed of a paper feed clutch.

FIGS. 3 and 4 illustrate a drive mechanism 60 for driving the sheet conveying apparatus 100. An input gear 65 is a spur gear which rotates by having a driving force (rotational force) inputted from a motor (not illustrated). A branch gear 63 is a gear configured by a gear having a smaller radius and a gear having a larger radius. The gear with a smaller radius engages with the input gear 65 and a driving force is transmitted from the input gear 65. The larger gear engages with an idler gear 64 and a registration idler gear 69 and transmits the driving force from the input gear 65 to the idler gear 64 and the registration idler gear 69.

As illustrated in FIG. 3, the registration idler gear 69 is engaged with a registration roller gear 70. The branch gear 63 transmits a driving force to the registration roller gear 70 via the registration idler gear 69. The registration roller gear 70 is fixed to the rotational shaft of the registration roller 41. Thus, the registration roller 41 rotates at a constant speed (first speed).

As illustrated in FIGS. 3 and 4, the idler gear 64 is further engaged with a first drive gear 71. As illustrated in FIG. 4, the first drive gear 71 is a gear for transmitting the driving force to the rotational shaft of the intermediate conveying roller 31. A second drive gear 72 is attached to the rotational shaft to which the first drive gear 71 is attached. The second drive gear 72 engages with an idler gear 68. The idler gear 68 is further engaged with a feed gear 67. The second drive gear 72 is rotated by the driving force inputted via the first drive gear 71 or the idler gear 68.

The first drive gear 71 is provided with a first one-way clutch 73. The first one-way clutch 73 is a clutch that transmits the driving force only when rotating in one direction. The second drive gear 72 is provided with a second one-way clutch 74. The second one-way clutch 74 is a clutch that transmits the driving force only when rotating in one direction. The first one-way clutch 73 and the second one-way clutch 74 idle with respect to the rotational shaft when rotating in the reverse direction, so they do not transmit the driving force to the rotational shaft.

As illustrated in FIG. 4, the branch gear 63 is engaged with a transmission gear 66. The rotational shaft of the transmission gear 66 is connected to a paper feed clutch 61. The paper feed clutch 61 is further engaged with the feed gear 67. The paper feed clutch 61 has a transmissive state in which it transmits the driving force from the transmission gear 66 to the feed gear 67, and a disconnected state in which it does not transmit the driving force from the transmission gear 66 to the feed gear 67. The paper feed clutch 61 is implemented, for example, by an electromagnetic clutch. When the paper feed clutch 61 is off, the chain of drives from the transmission gear 66 to the feed gear 67 is cut. When the paper feed clutch 61 is on, the chain of drives from the transmission gear 66 to the feed gear 67 is connected, and a driving force is inputted to the feed gear 67 via the paper feed clutch 61. The feed gear 67 drives the feed roller 22 and drives the intermediate conveying roller 31 via the idler gear 68.

FIG. 5 illustrates the rotational speed (conveying speed) of each roller according to the state of the paper feed clutch 61. The gear ratio between the plurality of gears constituting the drive mechanism 60 is set (designed) so as to satisfy the speed illustrated in FIG. 5. The first speed is a speed substantially the same as the conveying speed of the sheet P in the image forming unit 50. The second speed is a speed faster than the first speed. The relationship of the second speed to the first speed is determined by the required acceleration and the output of the motor.

When the paper feed clutch 61 is controlled to be off, the driving force is transmitted from the branch gear 63 to the first drive gear 71 via the idler gear 64. Thus, the first drive gear 71 drives the intermediate conveying roller 31 at the first speed. This driving force is not transmitted to the second drive gear 72 by the function of the second one-way clutch 74. Therefore, the feed roller 22 does not rotate.

When the paper feed clutch 61 is on, the driving force is transmitted to the branch gear 63, the transmission gear 66, the paper feed clutch 61, and the feed gear 67. As a result, the feed roller 22 rotates at the second speed. Furthermore, the driving force is transmitted from the feed gear 67 via the idler gear 68 to the second drive gear 72. As a result, the second drive gear 72 drives the intermediate conveying roller 31, and the intermediate conveying roller 31 is rotated at the second speed. At this time, the first drive gear 71 is rotated at the first speed. The intermediate conveying roller 31 rotates at the second speed faster than the first speed. Therefore, by the function of the first one-way clutch 73, the first drive gear 71 idles with respect to the intermediate conveying roller 31.

As described above, according to the first embodiment, by turning on/off the paper feed clutch 61, it is possible to transmit/disconnect the driving force to the feed roller 22 and switch the conveying speed of the intermediate conveying roller 31 between the first speed and the second speed. Meanwhile, in both the first speed and the second speed, the rotational speed of the motor is constant. That is, in order to switch the conveying speed of the intermediate conveying roller 31 between the first speed and the second speed, it is not necessary to change the rotational speed of the motor. For example, by temporarily turning on the paper feed clutch 61, it is possible to increase the conveying speed of the subsequent sheet P and shorten the distance between the preceding sheet P and the subsequent sheet P (sheet interval).

Conveyance Control

FIGS. 6A to 6D illustrates the conveyance positions of two sheets P1 and P2 to be consecutively conveyed, the conveying speeds of the rollers, and the states of the paper feed clutch 61. At the timing illustrated in FIG. 6A, an image is formed on the sheet P1 in the image forming unit 50. At this timing, the trailing end of the sheet P1 has not passed through the intermediate conveying roller pair 30. The paper feed clutch 61 is off. At this time, the registration roller 41 and the intermediate conveying roller 31 are respectively rotated at the first speed. Since the paper feed clutch 61 is off, the driving force is not transmitted to the paper feed roller group 20. The paper feed roller group 20 rotates driven by the sheet P1 until the sheet P1 passes through a separation nip. When the trailing end of the sheet P1 passes through the separation nip, the paper feed roller group 20 stops. When the paper feed roller group 20 stops, the sheet P2 is positioned in the sheet cassette 2. The separation nip is formed by pressing the feed roller 22 and the separation roller 23.

Figure 6A:
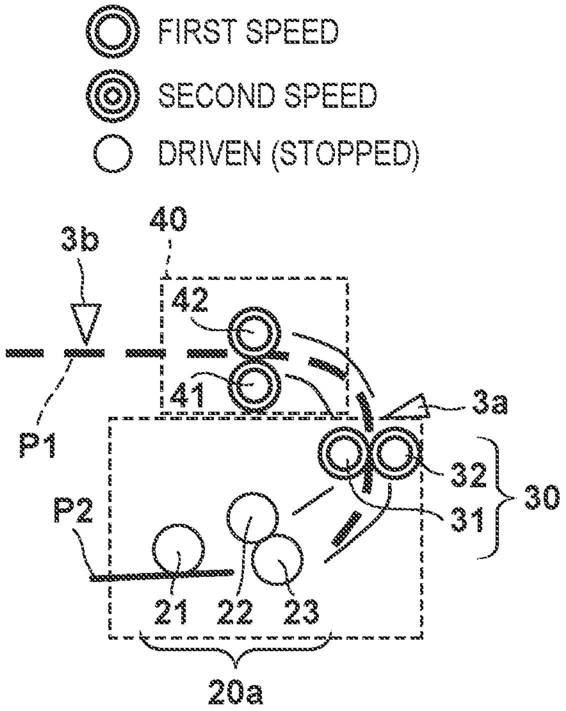
FIGS. 6A to 6D are views explaining a relationship between the state and speed of the paper feed clutch.
Figure 6B:
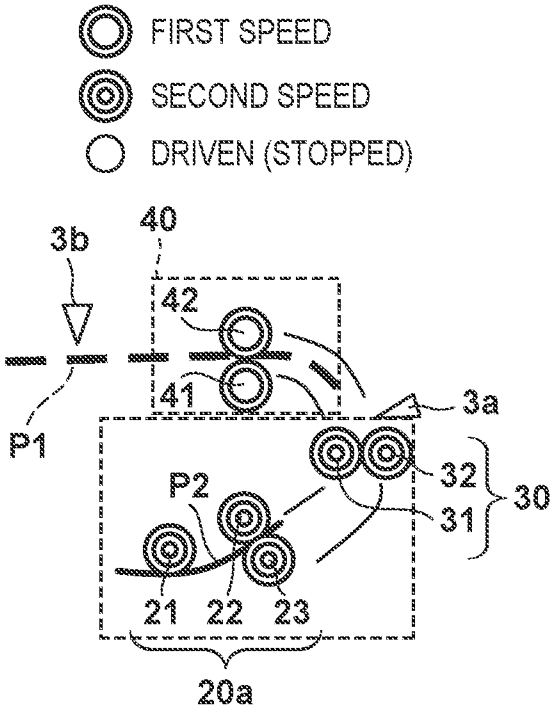

As illustrated in FIG. 6B, when the sheet sensor 3*a* detects that the trailing end of the sheet P1 has passed through the intermediate conveying roller pair 30, the paper feed clutch 61 is turned on. Thus, the paper feed roller group 20 rotates at a second speed, and the pickup roller 21 and the feed roller 22 start conveying the sheet P2. At this time, the sheet P1 is nipped (sandwiched) by the registration roller pair 40. Therefore, the sheet P1 is conveyed at the first speed.

When the sheet sensor 3*a* detects the leading end of the sheet P2, the image forming apparatus 1 calculates a distance (sheet interval) L from the trailing end of the sheet P1 to the leading end of the sheet P2. The image forming apparatus 1 clocks a time T from the time when the paper feed clutch 61 is turned on to the time when the sheet sensor 3*a* detects the leading end of the sheet P2 by a timer, a counter, or the like. Since the sheet P1 is conveyed at a first speed V1, the distance L is the product of the first speed V1 and the time T. Here a target distance is X, and, when X<L, by further conveying the sheet P2 at a second speed V2 over a time T0, the distance from the trailing end of the sheet P1 to the leading end of the sheet P2 becomes the target distance X.

$$T0=(L-X)/(V2-V1) \quad (1)$$

Figure 6C:
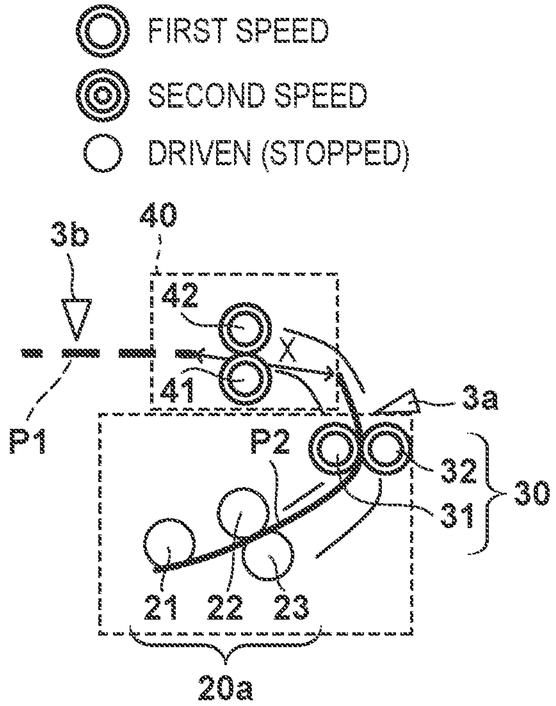

The image forming apparatus 1 switches the paper feed clutch 61 from on to off at a timing when the predetermined time T0 has elapsed from a time when the sheet sensor 3*a* detects the leading end of the sheet P2. Thus, as illustrated in FIG. 6C, the distance L from the trailing end of the sheet P1 to the leading end of the sheet P2 coincides with the target distance X.

Incidentally, the timing at which the paper feed clutch 61 is switched from on to off needs to be before the sheet P2 reaches the registration roller pair 40. The registration roller pair 40 rotates at the first speed V1. That is, when the sheet P2 reaches the registration roller pair 40, the conveying speed of the sheet P2 changes from the second speed V2 to the first speed V1, and it is no longer possible to shorten the distance from the sheet P2 to the sheet P1. Further, in order to prevent unnecessary bending from occurring in the sheet P2, the paper feed clutch 61 is switched off before the sheet P2 reaches the registration roller pair 40.

Figure 6D:
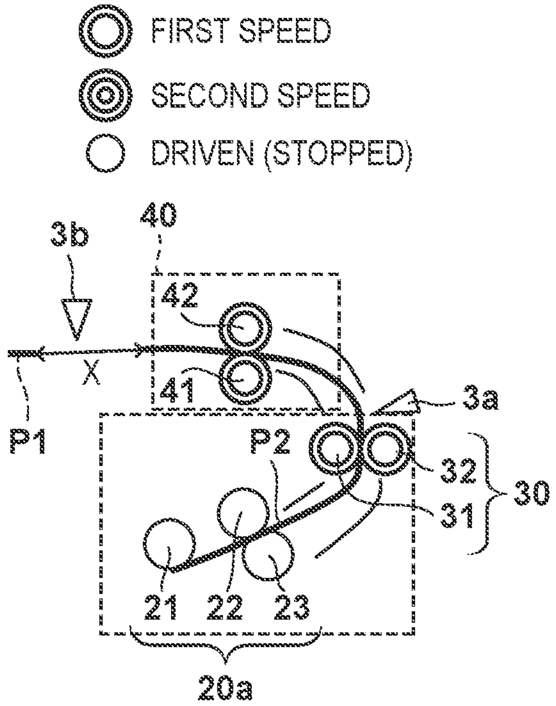

As illustrated in FIG. 6D, the registration roller pair 40 sandwiches and conveys the sheet P2. Since the registration roller pair 40 rotates at the first speed V1, the distance L between the sheet P1 and the sheet P2 is maintained at the target distance X. Thereafter, the sheet P2 passes through the sheet sensor 3*b* and is conveyed to the image forming unit 50.

Incidentally, there is variation in the time T required for the sheet P to move from the paper feed roller group 20 to the intermediate conveying roller pair 30. The cause for this is that the stacking position of the sheet P in the sheet cassette 2 varies, that the surface state of the sheet P or the surface state of the paper feed roller group 20 varies, and the like. Therefore, the time T0 for conveying the sheet P2 at the second speed V2 is adjusted.

Figure 7:
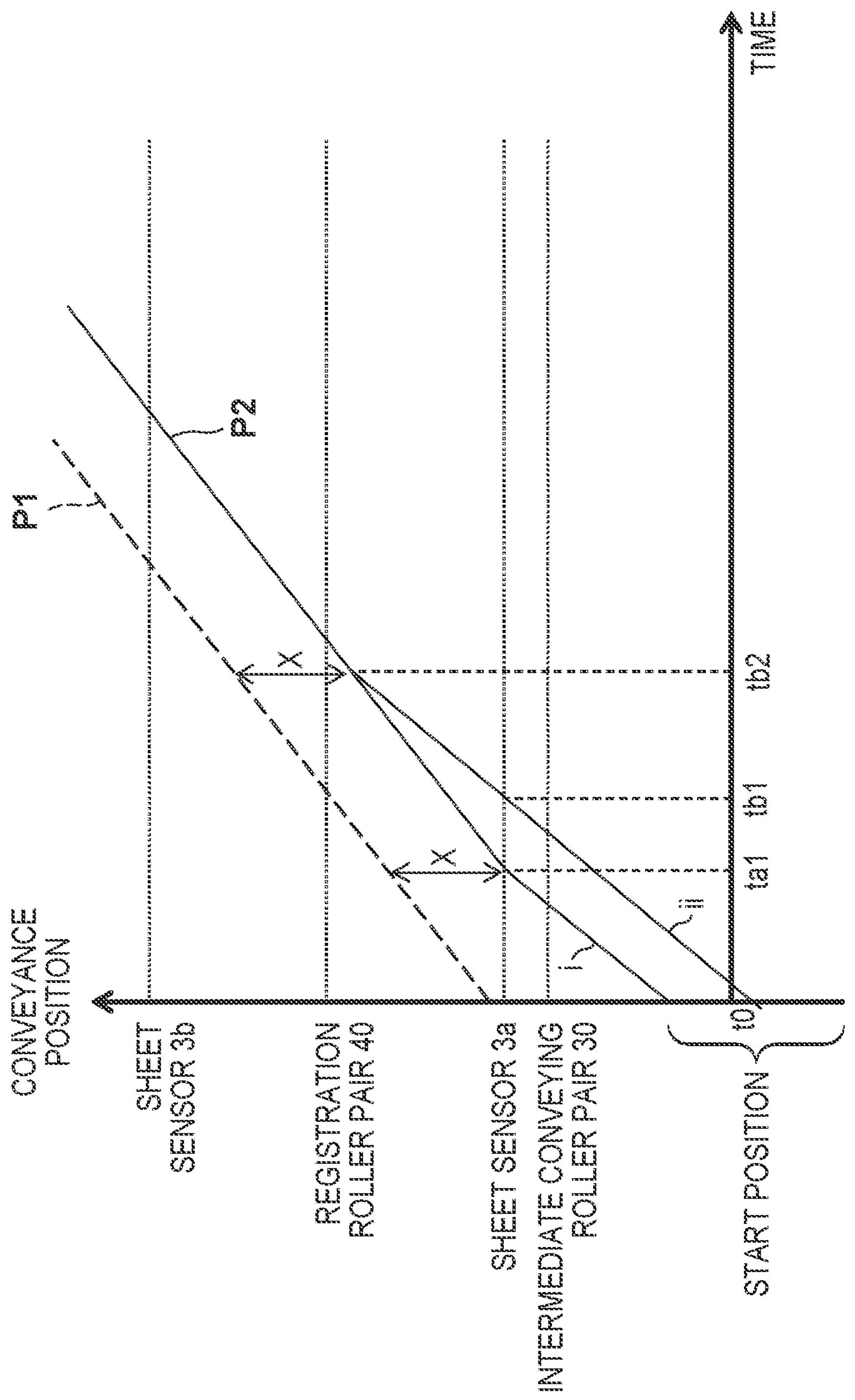
FIG. 7 is a view explaining a timing to turn off the paper feed clutch.

FIG. 7 is a diagram illustrating the conveyance positions of the trailing end of the preceding sheet P1 and the conveyance positions of the leading end of the subsequent sheet P2. The vertical axis indicates the conveyance position. The horizontal axis indicates time.

There is a variation in the time T for conveying the sheet P in a conveyance section from the paper feed roller group 20 to the intermediate conveying roller pair 30. i in FIG. 7 indicates the conveyance position of the leading end of the sheet P2 in the case where the time T is the shortest. This is, for example, the case where the sheet P has already been brought out to the separation nip in the sheet cassette 2.

When the paper feed clutch 61 is turned on at time t0, the sheet P2 starts conveyance at the second speed V2. At time ta1, the sheet sensor 3*a* detects the leading end of the sheet P2. At time ta1, the distance L between the sheet P1 and the sheet P already matches the target distance X. Therefore, as soon as the sheet sensor 3*a* detects the sheet P2, the image forming apparatus 1 switches the paper feed clutch 61 from on to off. Thereafter, the intermediate conveying roller pair 30 and the registration roller pair 40 convey the sheet P2 to the image forming unit 50.

The case illustrated by ii in FIG. 7 is the case where the sheet P2 is fed and conveyed at the latest timing in the design. This case may occur if the paper feed roller group 20 has reached the end of its service life or if the surface of the sheet P is slippery. The paper feed clutch 61 is turned on at time t0, and the leading end of the sheet P2 reaches the sheet sensor 3*a* at time tb1. Thereafter, the paper feed clutch 61 is turned off at time tb2 at which the distance L between the sheet P1 and the sheet P2 becomes the target distance X. Thereafter, the sheet P1 and the sheet P2 are conveyed at the first speed V1 so that the distance L with respect to the sheet P1 is maintained at the target distance X.

As illustrated in FIG. 7, the paper feed timing of the sheet P2 may be set to after the trailing end of the sheet P1 passes through the intermediate conveying roller pair 30. However, this is merely an example. A mechanism for delaying the transmission of the driving force may be inserted in the chain of drives present from the feed gear 67 to the second drive gear 72 of the intermediate conveying roller 31. Thus, before the sheet P1 passes through the intermediate conveying roller pair 30, feeding of the sheet P2 may be started.

Controller

Figure 8:
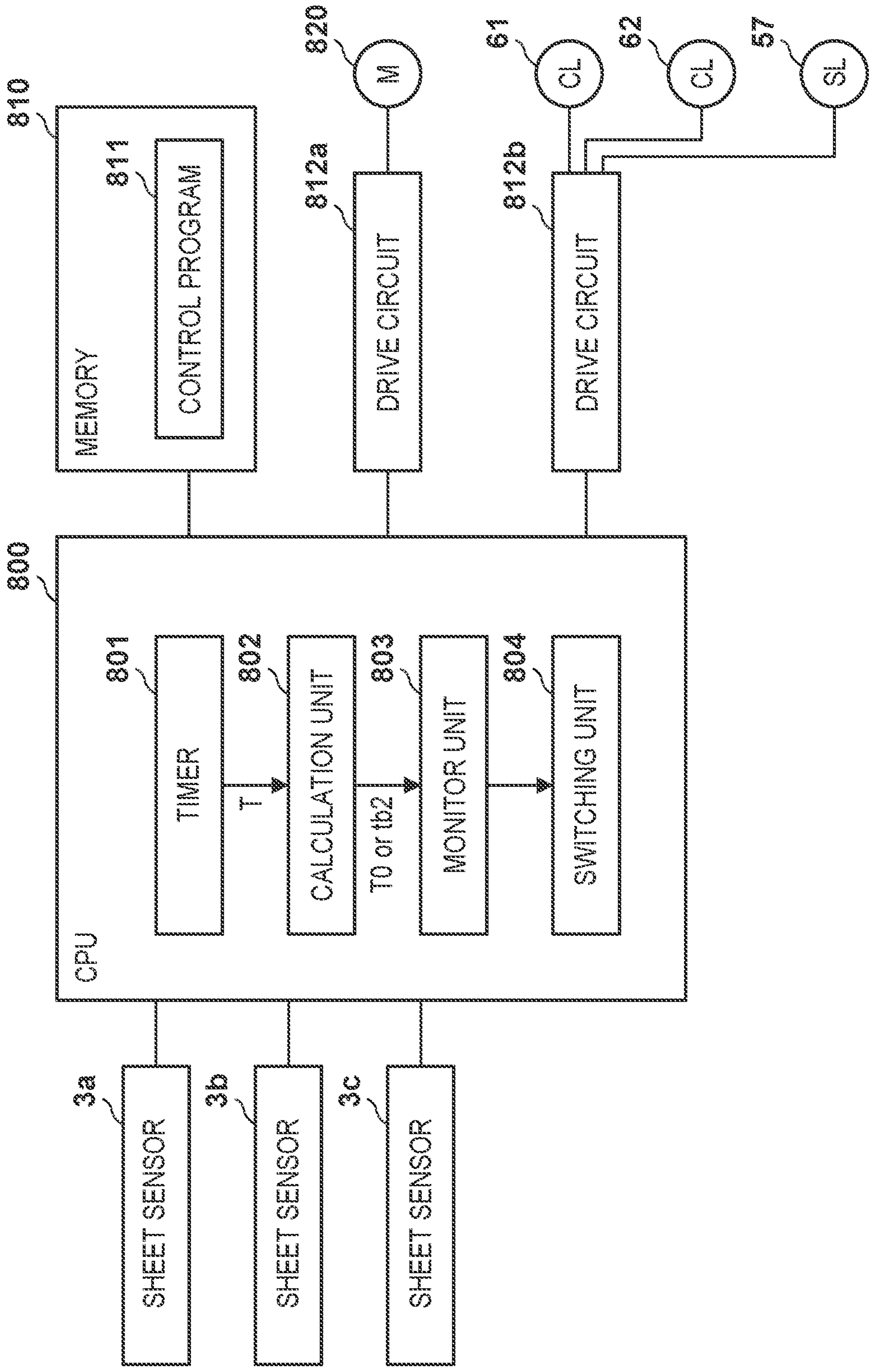
FIG. 8 is a view explaining a controller.

FIG. 8 illustrates the controller of the sheet conveying apparatus 100. A CPU 800 realizes various functions by executing a control program 811 stored in a memory 810. Part or all of these functions may be implemented by a hardware circuit such as an ASIC (Application Specific Integrated Circuits) or an FPGA (Field Programmable Gate Arrays). A timer 801 measures various times. For example, the timer 801 measures the time T from a timing when the paper feed clutch 61 turns on to a timing when the sheet sensor 3*a* detects the leading end. A calculation unit 802 calculates the time T0 from the time T measured by the timer 801. The calculation unit 802 may calculate the time tb2 by adding the time T0 to the time t0. A monitoring unit 803 monitors or determines whether the time T0 has elapsed from the time t0. The monitoring unit 803 may monitor whether the time tb2 has arrived. When the time tb2 arrives, the monitoring unit 803 outputs a trigger signal to a switching unit 804. The switching unit 804 instructs a drive circuit 812*b* to switch the paper feed clutch 61 from off to on in response to the trigger signal outputted from the monitoring unit 803. The CPU 800 instructs a drive circuit 812*a* to drive a motor 820. The motor 820 generates a driving force and supplies it to the input gear 65. A registration clutch 62 described in a second embodiment may be connected to the drive circuit 812*b*. A solenoid 57 described in a third embodiment may be connected to the drive circuit 812*b*.

Flowchart

Figure 9:
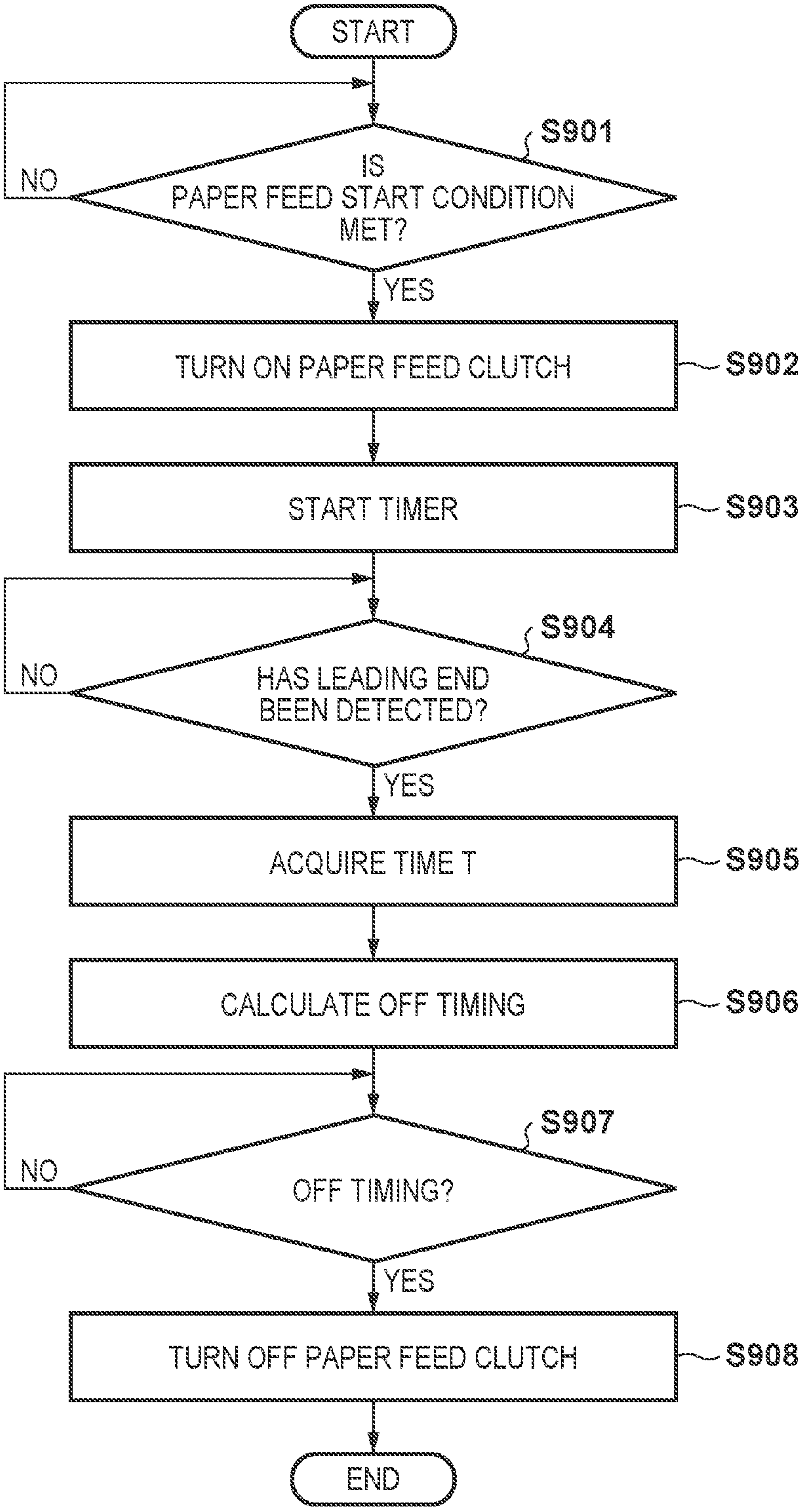
FIG. 9 is a flowchart explaining a method for controlling the clutch.

FIG. 9 illustrates a method for controlling the paper feed clutch 61 executed by the CPU 800 in accordance with the control program 811. In step S901, the CPU 800 determines whether a paper feed start condition is met. The paper feed start condition is a condition for allowing to start feeding the subsequent sheet P2. The paper feed start condition may be, for example, that the trailing end of the preceding sheet P1 has passed the sheet sensor 3*a*. The CPU 800 proceeds to step S902 when the paper feed start condition is met.

In step S902, the CPU 800 switches the paper feed clutch 61 to on. For example, the CPU 800 outputs an on command to the drive circuit 812*b*, so that the drive circuit 812*b* switches the paper feed clutch 61 from off to on. When the paper feed clutch 61 is turned on, the driving force is transmitted to the paper feed roller group 20 via the paper feed clutch 61. Thus, the paper feed roller group 20 and the intermediate conveying roller 31 start to rotate at the second speed V2, and the sheet P2 is conveyed at the second speed V2. The sheet P1 continues to be conveyed at the first speed V1 by the registration roller pair 40.

In step S903, the CPU 800 starts the timer 801. That is, the timer 801 starts measuring the time T.

In step S904, the CPU 800 determines whether the leading end of the sheet P2 has been detected by the sheet sensor 3*a*. When the leading end of the sheet P2 is detected, the CPU 800 proceeds to step S905.

In step S905, the CPU 800 acquires the time T from the timer 801.

In step S906, the CPU 800 calculates the time tb2, which is an off timing of the paper feed clutch 61, based on the time T. The CPU 800 calculates the time tb2 by calculating the time T0 from the time T and adding the time T0 to the time t0.

In step S907, the CPU 800 determines whether an off timing has arrived based on the timer value of the timer 801. When the time tb2 which is an off timing arrives, the CPU 800 proceeds to step S908.

In step S908, the CPU 800 switches the paper feed clutch 61 from on to off. For example, the CPU 800 outputs an off command to the drive circuit 812*b*, so that the drive circuit 812*b* switches the paper feed clutch 61 from on to off.

According to the first embodiment, the sheet conveying apparatus 100 changes the speed of the intermediate conveying roller 31 by turning on and off the paper feed clutch 61 that controls the driving of the paper feed roller group 20. When the paper feed clutch 61 is turned on, the rotational speed of the intermediate conveying roller 31 is accelerated from the first speed to the second speed. In other words, the paper feed roller group 20 rotates at the second speed during a period in which the driving force is transmitted to the paper feed roller group 20 via the paper feed clutch 61. Thus, a special clutch for changing the speed of the intermediate conveying roller 31 is not required, which reduces cost.

Second Embodiment

In the first embodiment, the intermediate conveying roller 31 is accelerated by the paper feed clutch 61 to reduce the distance between the sheet P1 and the sheet P2. In the second embodiment, a transmission mechanism of the registration roller 41 is added in addition to the first embodiment. In the second embodiment, the same reference numerals are given to the matters in common with the first embodiment, and the description thereof is referenced.

Figure 10:
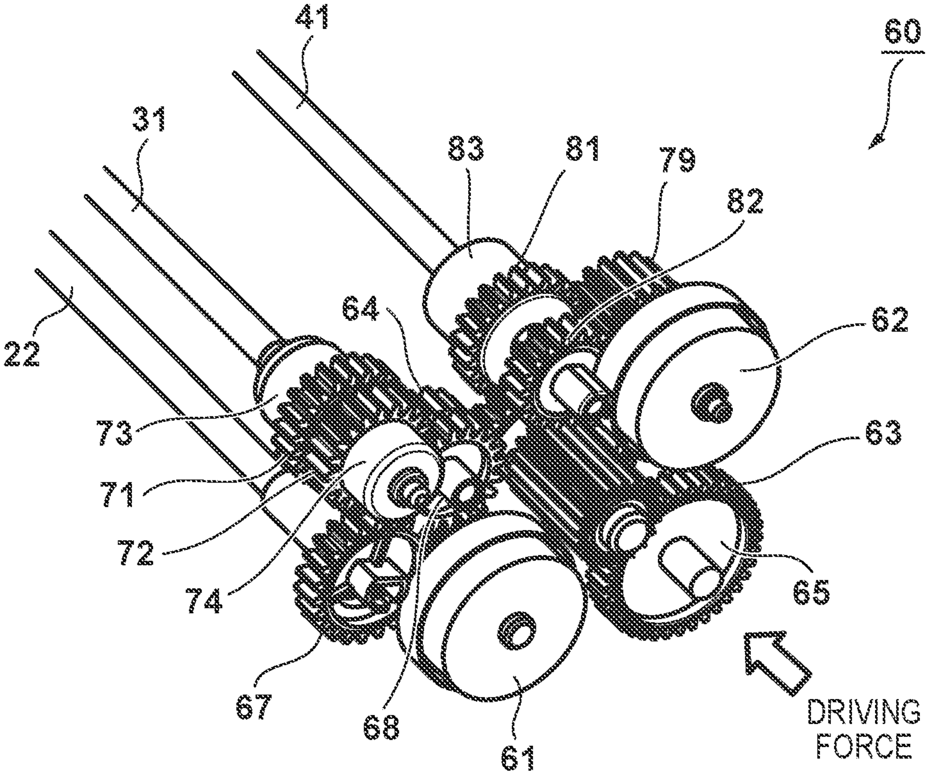
FIG. 10 is a view explaining the chain of drives.

FIG. 10 illustrates the drive mechanism 60 of the second embodiment. The registration idler gear 69 and the registration roller gear 70 illustrated in FIG. 3 are replaced by the registration clutch 62, a transmission gear 79, a first drive gear 81, a one-way clutch 83 and a second drive gear 82 in FIG. 10.

Figure 11:
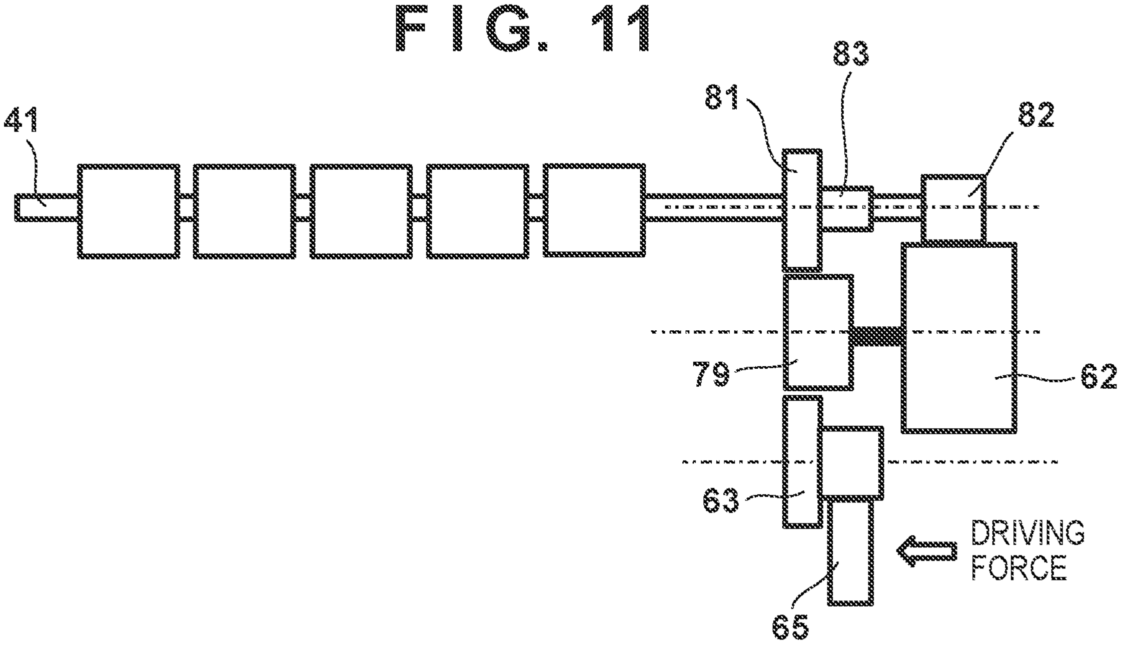
FIG. 11 is a view explaining the chain of drives.

As illustrated in FIG. 11, the branch gear 63 is engaged with the transmission gear 79. A driving force inputted from the motor 820 to the input gear 65 is transmitted to the transmission gear 79 via the branch gear 63. Further, the transmission gear 79 is engaged with the first drive gear 81. Therefore, the transmission gear 79 transmits the driving force to the first drive gear 81. Since the first drive gear 81 is locked via the one-way clutch 83 to the rotational shaft of the registration roller 41, the first drive gear 81 rotates the registration roller 41. In this case, the registration clutch 62 is off and the registration roller 41 rotates at the first speed V1.

Meanwhile, the transmission gear 79 transmits the driving force to the registration clutch 62. The registration clutch 62 may be an electromagnetic clutch controlled by the CPU 800. When the registration clutch 62 is on, the driving force is transmitted from the registration clutch 62 to the second drive gear 82. Since the second drive gear 82 is fixed to the rotational shaft of the registration roller 41, the registration roller 41 also rotates by the second drive gear 82 rotating. As described above, when the registration clutch 62 is turned on, the driving force is transmitted to the registration roller 41 via the registration clutch 62. Thus, the registration roller 41 rotates at the second speed V2. Thus, the rotational speed of the registration roller 41 can be switched by turning the registration clutch 62 off and on.

Incidentally, the one-way clutch 83 is connected to the first drive gear 81. When the registration clutch 62 is off, the one-way clutch 83 locks the first drive gear 81 to the rotational shaft of the registration roller 41. When the registration clutch 62 is on, the one-way clutch 83 causes the first drive gear 81 to be free from the rotational shaft of the registration roller 41. That is, the one-way clutch 83 causes the first drive gear 81 to be idle.

Conveyance Control

FIGS. 12A to 12D illustrates the conveyance positions of two sheets P1 and P2 to be consecutively conveyed, the conveying speeds of the rollers, and the states of the registration clutch 62 and the paper feed clutch 61. At the timing illustrated in FIG. 12A, an image is formed on the sheet P1 in the image forming unit 50. At this timing, the trailing end of the sheet P1 has not passed through the intermediate conveying roller pair 30. Both the paper feed clutch 61 and the registration clutch 62 are off. Therefore, the registration roller 41 and the intermediate conveying roller 31 are respectively rotated at the first speed V1.

Figure 12A:
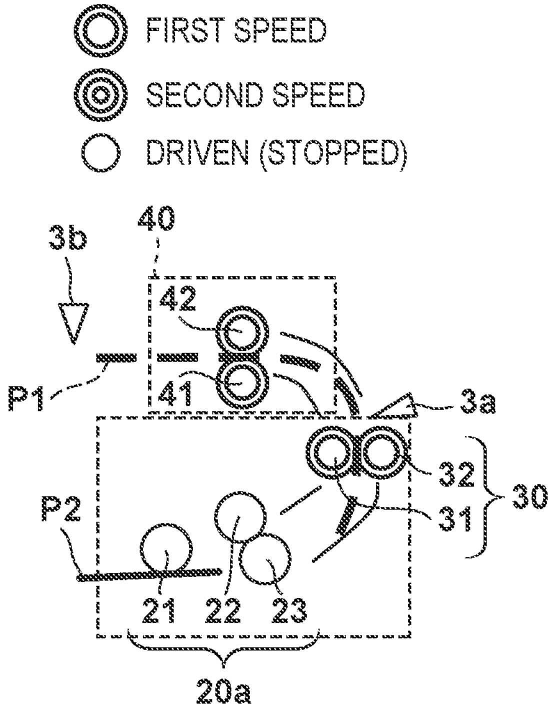
FIGS. 12A to 12D are views explaining the relationship between the state and speed of the paper feed clutch.
Figure 12B:
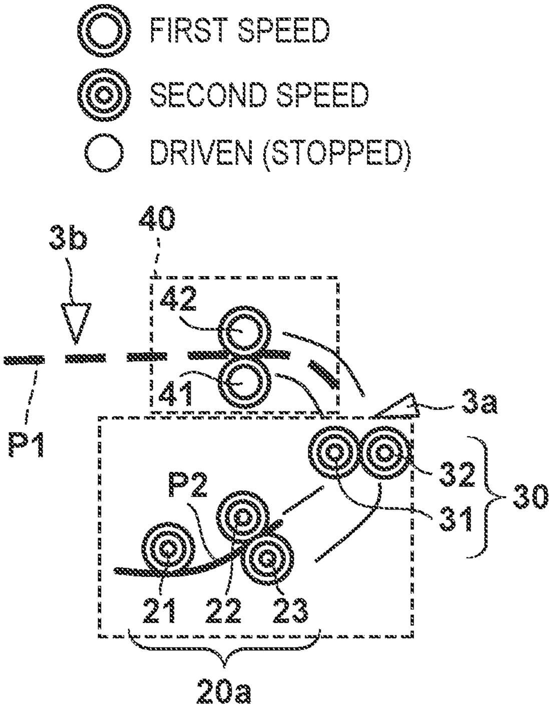

According to FIG. 12B, when the sheet sensor 3*a* detects that the trailing end of the sheet P1 has passed through the intermediate conveying roller pair 30, the paper feed clutch 61 is turned on. Thus, the paper feed roller group 20 and the intermediate conveying roller 31 rotate at the second speed V2, and the pickup roller 21 and the feed roller 22 starts conveying the sheet P2. At this time, the sheet P1 is nipped by the registration roller pair 40. Also, since the registration clutch 62 remains turned off, the registration roller pair 40 rotates at the first speed V1. Therefore, the sheet P1 is conveyed at the first speed V1. The registration roller pair 40 rotates at the first speed V1 until at least the trailing end of the sheet P1 passes through the registration roller pair 40. For example, when the sheet sensor 3*b* detects that the trailing end of the sheet P1 has passed, the CPU 800 turns on the registration clutch 62. Thus, after the sheet P1 passes through the registration roller pair 40 and before the sheet P2 reaches the registration roller 41, the registration clutch 62 is turned on, and the registration roller 41 is accelerated from the first speed V1 to the second speed V2.

Figure 12C:
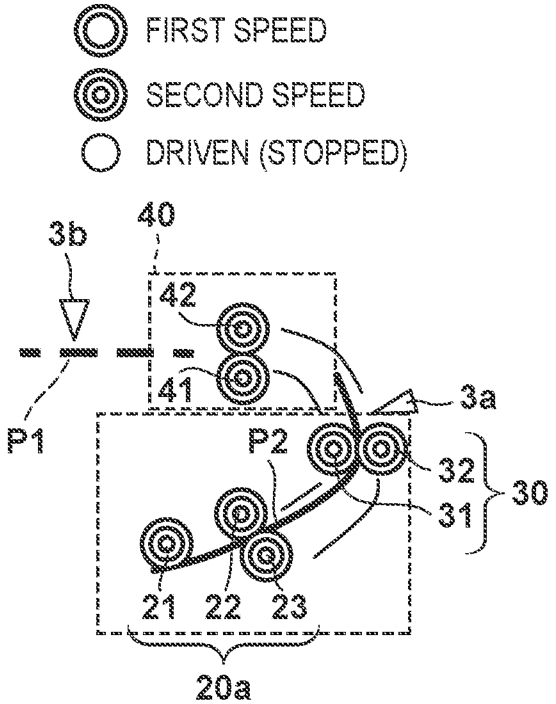

As illustrated in FIG. 12C, when the sheet sensor 3*a* detects the leading end of the sheet P2, the CPU 800 acquires the time T from the timer 801. The CPU 800 calculates the distance L to the leading end of the sheet P2 from the trailing end of the sheet P1 based on the time T. As described in the first embodiment, the CPU 800 calculates the time T0 based on the time T, the distance L, the first speed V1, the second speed V2, and the target distance X. The time T0 is a time during which the registration roller 41 and the intermediate conveying roller 31 should rotate at the second speed V2. In addition, the time T0 is a time during which both the paper feed clutch 61 and the registration clutch 62 are on. The CPU 800 calculates a timing at which both the paper feed clutch 61 and the registration clutch 62 are switched off (off timing) based on the time T0.

Figure 12D:
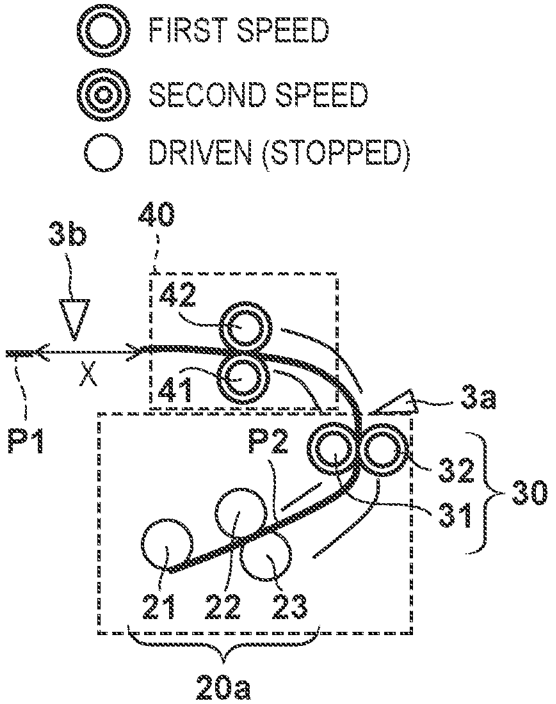

FIG. 12D illustrates the off timing for the paper feed clutch 61 and the registration clutch 62. When the distance L between the sheet P1 and the sheet P2 matches the target distance X, the paper feed clutch 61 and the registration clutch 62 are turned off. Thus, the intermediate conveying roller 31 and the registration roller 41 decelerate from the second speed V2 to the first speed V1.

Here, the paper feed clutch 61 and the registration clutch 62 are turned off at the same time, but this is merely an example. There is variation in response in the electromagnetic clutch. There is a period in which the registration roller pair 40 and the intermediate conveying roller pair 30 convey the sheet P at the same speed. In this period, when the off timing of the paper feed clutch 61 becomes later than the off timing of the registration clutch 62, the sheet P is pulled by the registration roller pair 40 and the intermediate conveying roller pair 30. In contrast, when the off timing of the paper feed clutch 61 becomes earlier than the off timing of the registration clutch 62, the sheet P is bent by the registration roller pair 40 and the intermediate conveying roller pair 30. A small bend is allowed. Therefore, the off timing of the paper feed clutch 61 may be earlier than the off timing of the registration clutch 62 so that a small bend occurs.

Figure 13:
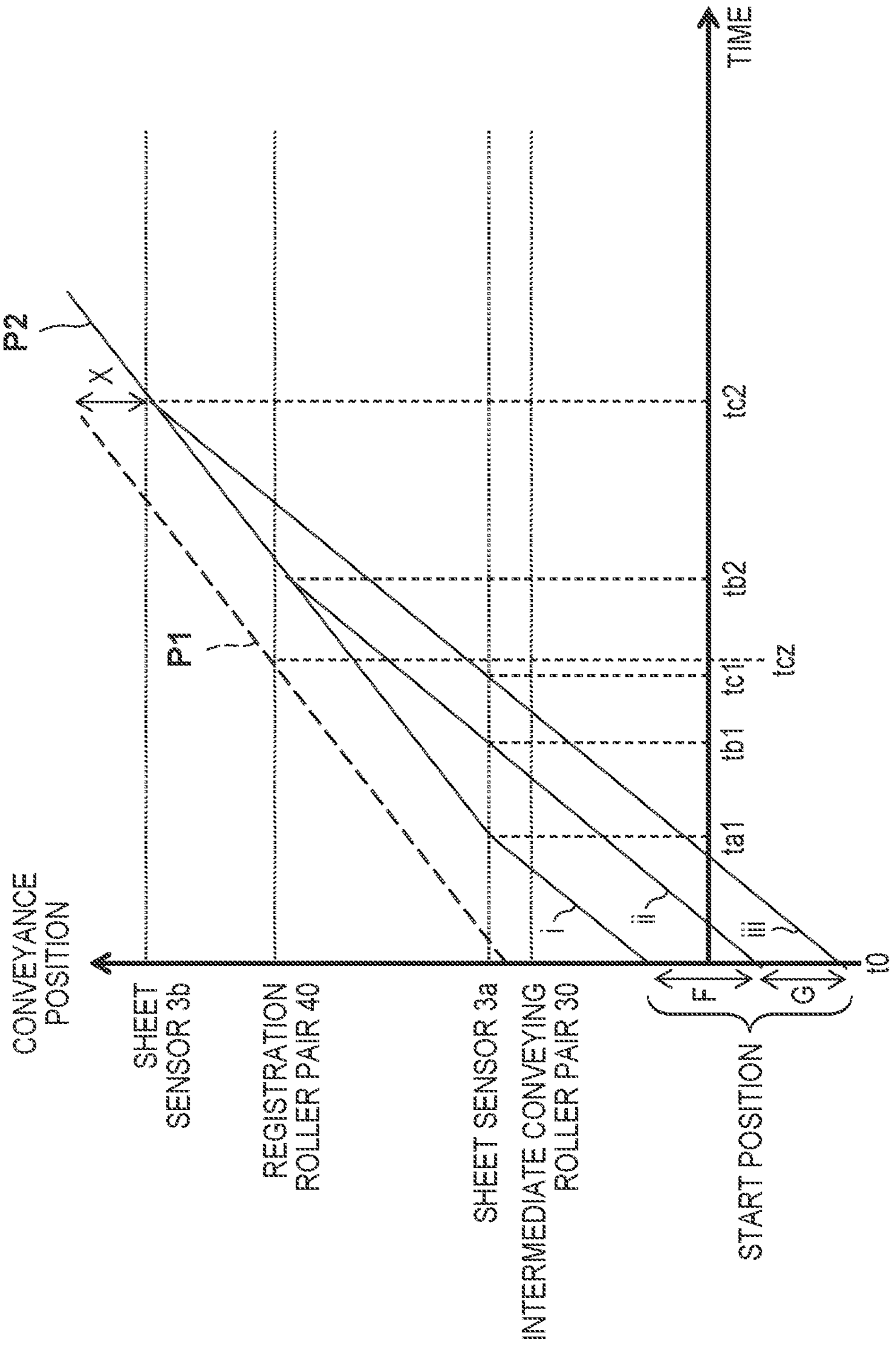
FIG. 13 is a view explaining the timing to turn off the paper feed clutch.

FIG. 13 is a diagram illustrating the conveyance positions of the trailing end of the preceding sheet P1 and the conveyance positions of the leading end of the subsequent sheet P2. The vertical axis indicates the conveyance position. The horizontal axis indicates time. As described with reference to FIG. 7, the first embodiment can address the case of i and the case of ii. The second embodiment can further address the case of iii. The case of iii is a case in which the sheet P2 is stacked in the sheet cassette 2*a* such that the leading end of the sheet P2 is further positioned on the upstream side in the conveyance direction of the sheet P than in the case of ii. In the second embodiment, the registration roller pair 40 can be accelerated to the second speed V2. Therefore, from the time t0, which is the conveyance start time, until a time tc2 at which the leading end of the sheet P2 arrives at the sheet sensor 3*b*, the sheet P2 can be conveyed at the second speed V2.

In FIG. 13, by the sheet sensor 3*a* detecting the leading end of the sheet P2, the time T is timed by the timer 801. In the case of iii, the time T is obtained by detecting the leading end of the sheet P2 by the sheet sensor 3*a* at time tc1. Furthermore, the time T0 is calculated from the time T to determine the off timing. In the case of iii, time tc2 is determined to be the off timing.

Incidentally, the registration clutch 62 may be turned on at or after time tcz when the trailing end of the sheet P1 passes through the registration roller pair 40. When the registration clutch 62 is turned on, the registration roller pair 40 rotates at the second speed V2. Thereafter, the sheet P2 is transferred to the registration roller pair 40. When the sheet P2 is positioned slightly in front of the sheet sensor 3*b* (time tc2), the paper feed clutch 61 and the registration clutch 62 are switched off at the same time. Thus, the distance between the sheet P1 and the sheet P2 is adjusted to the target distance X.

In the second embodiment, the rotational speed of the registration roller 41 is switched by the registration clutch 62, so that the conveyance variation that the sheet conveying apparatus 100 can handle with increases. That is, the performance of the sheet conveying apparatus 100 is improved. As illustrated in FIG. 13, in the first embodiment, the sheet conveying apparatus 100 can handle with variations in the leading end position of the sheet P2 up to a distance F, in the second embodiment, the sheet conveying apparatus 100 can handle with variations in the leading end position of the sheet P2 up to a distance F+G.

In addition to being able to achieve the same effect as the first embodiment, the second embodiment can further handle with many conveyance variations. Although the cost related to the registration clutch 62 increases, the cost is still reduced.

In the second embodiment, the paper feed clutch 61 and the registration clutch 62 are switched off before the sheet sensor 3*b* detects the leading end of the sheet P2. That is, when the trailing end of the sheet P2 passes through the sheet sensor 3*b*, the sheet P2 is conveyed at the first speed V1. However, this is merely an example. If the response performance of the paper feed clutch 61 and the registration clutch 62 and the performance of the motor 820 allows, the paper feed clutch 61 and the registration clutch 62 may be switched off after the leading end of the sheet P passes through the sheet sensor 3*b*.

Third Embodiment

In the first embodiment and the second embodiment, the sheet P fed from the sheet cassette 2*a* was described. In the third embodiment, the sheet P fed from the sheet cassette 2*b* of the optional paper feed apparatus 10 will be described.

Figure 14A:
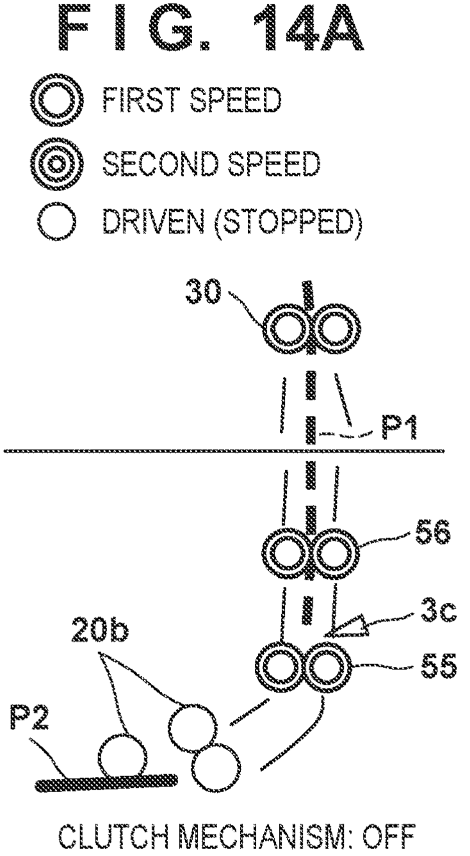
FIGS. 14A to 14C are views explaining a relationship between the state and speed of a clutch mechanism.
Figure 14B:
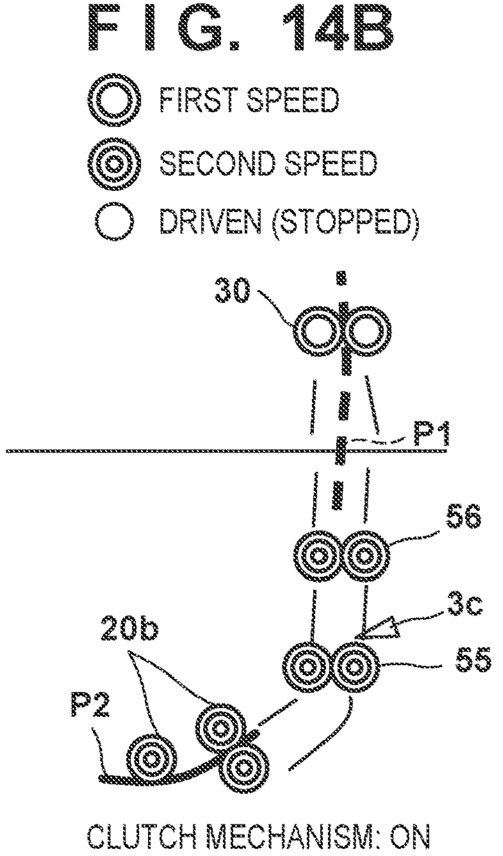
Figure 14C:
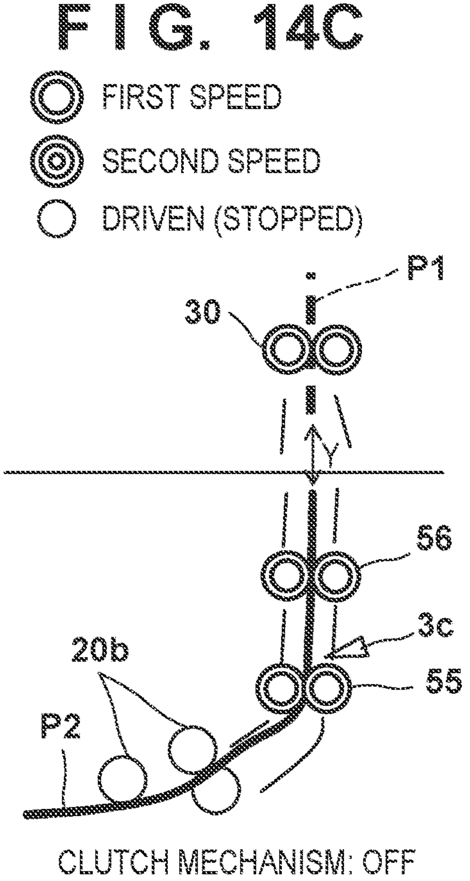
Figure 15A:
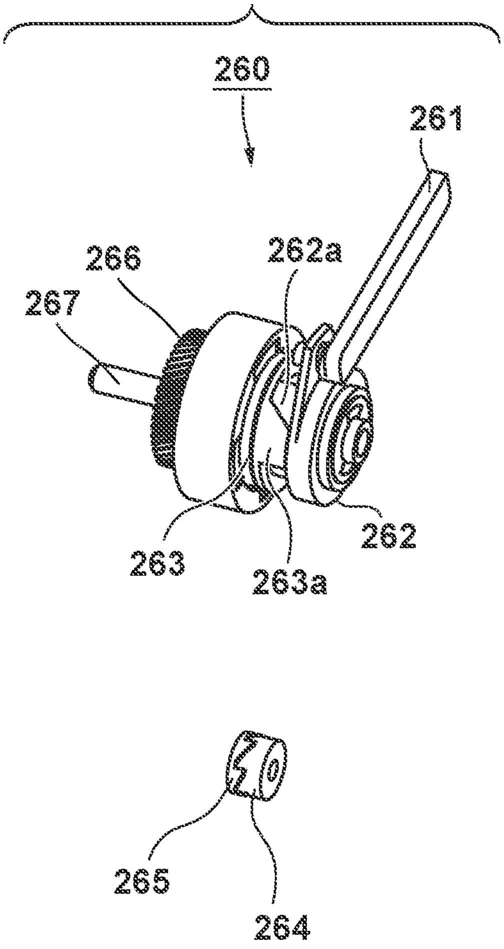
FIGS. 15A and 15B are views explaining the clutch mechanism.
Figure 15B:
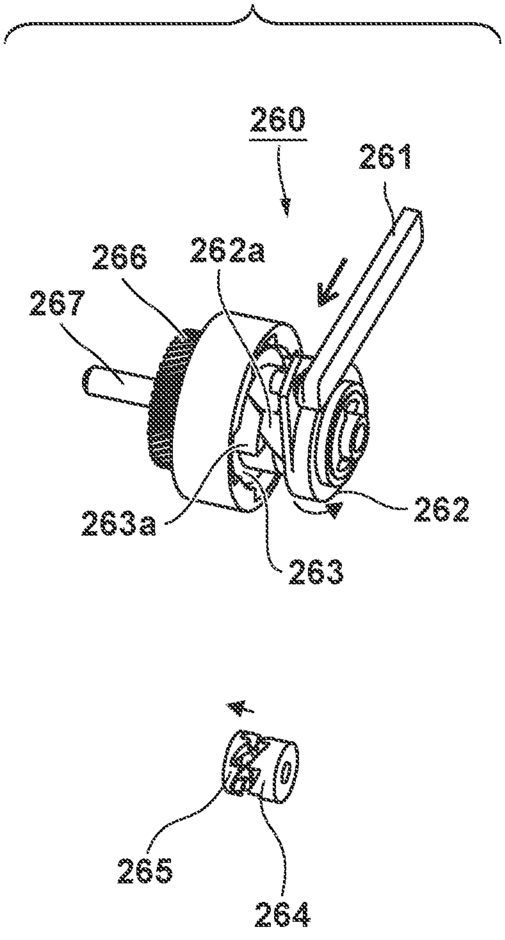

FIGS. 14A to 14C illustrates the conveyance positions of two sheets P1 and P2 to be consecutively conveyed, the conveying speeds of the rollers, and the states of a clutch mechanism. The configuration of the chain of drives in the third embodiment is similar to that of the chain of drives in the second embodiment. In other words, the paper feed roller group 20*b* corresponds to the paper feed roller group 20*a*, the conveying roller pair 55 corresponds to the intermediate conveying roller pair 30, and the outlet roller pair 56 corresponds to the registration roller pair 40. Therefore, the details of the chain of drives in the third embodiment reference the description of the chain of drives of the first and second embodiments. However, in the third embodiment, a different clutch is employed as the paper feed clutch 61 and the registration clutch 62. That is, a clutch mechanism 260 illustrated in FIG. 15A and FIG. 15B is employed in place of the electromagnetic clutch. FIG. 15A illustrates that the clutch mechanism 260 is in an on state (transmissive state). FIG. 15B illustrates that the clutch mechanism 260 is in an off state (disconnected state).

Since the optional paper feed apparatus 10 does not include a drive source, the driving force generated by the motor 820 is transmitted to the optional paper feed apparatus 10 via a gear or the like. The clutch mechanism 260 switches between transmitting and disconnecting the driving force by a cam or the like.

As illustrated in FIG. 14A, the sheet sensor 3*c* is provided downstream of the conveying roller pair 55. The sheet sensor 3*c* detects the leading end of the sheet P fed from the sheet cassette 2*b* and outputs a detection signal to the CPU 800. As FIG. 14A illustrates, the clutch mechanism 260 is off prior to the start of conveyance of the sheet P2. Therefore, the conveying roller pair 55 and the outlet roller pair 56 rotate at the first speed V1. As FIG. 14B illustrates, when the trailing end of the sheet P2 passes through the outlet roller pair 56, the CPU 800 switches the clutch mechanism 260 from off to on. Thus, the paper feed roller group 20*b*, the conveying roller pair 55, and the outlet roller pair 56 rotate at the second speed V2. The CPU 800 determines a timing to switch off the clutch mechanism 260 based on the time T measured until the sheet P2 is detected by the sheet sensor 3*c*. The time T is the time corresponding to the distance L from the trailing end of the sheet P1 to the leading end of the sheet P2. The target distance of the distance L from the trailing end of the sheet P1 to the leading end of the sheet P2 is assumed to be Y. The CPU 800 switches the clutch mechanism 260 off at a timing when the distance L matches the target distance Y. Thus, the sheet P2 is conveyed to the sheet conveying apparatus 100 while maintaining the distance to the sheet P1 at the target distance Y.

As FIG. 15A and FIG. 15B illustrate, when a control lever 261 moves in the direction of the arrow, a control cam 262 rotates. The control cam 262 is a so-called end cam. The end cam is a cylindrical cam and is a cam whose length of the cylinder in the axial direction varies according to the rotational phase of the cylinder. A driven node is in contact with one end face of the two end faces in the axial direction of the cylinder, the driven node is moved in the axial direction of the cylinder by the cylinder rotating. When the control cam 262 rotates, the connection state of an output gear 266 and an input shaft 267 is changed.

More particularly, the driving force generated by the motor 820 is inputted to the input shaft 267. An input engagement member 264 is fixed to the input shaft 267. When the input engagement member 264 is engaged with an output engagement member 265, the driving force inputted to the input shaft 267 is transmitted to the output gear 266 via the input engagement member 264 and the output engagement member 265.

The output engagement member 265 is biased by an elastic body such as a spring toward the input engagement member 264 together with a clutch member 263. More particularly, the clutch member 263 is biased toward the control cam 262 and the clutch member 263 and the control cam 262 are always in contact. The control cam 262 has a cam portion 262*a*, and the clutch member 263 has a cam portion 263*a*. Depending on the rotational phase of the control cam 262, the axial position of the clutch member 263 changes. In FIG. 15A, a condition is illustrated in which the clutch mechanism 260 is on, that is, the driving force is transmitted from the input shaft 267 to the output gear 266. Since the clutch member 263 in FIG. 15A is positioned on the right side, the input engagement member 264 and the output engagement member 265 engages.

As FIG. 15B illustrates, when the clutch mechanism 260 is off, the transmission of driving force from the input shaft 267 to the output gear 266 is disengaged. More particularly, by the control lever 261 moving in the direction of the arrow, the control cam 262 is rotated. When the end surface (cam surface) of the cam portion 262*a* of the control cam 262 presses the end surface of the cam portion 263*a* of the clutch member 263, the clutch member 263 moves to the left in the drawing. Thus, the output engagement member 265 also moves to the left. As a result, the transmission of the driving force from the input engagement member 264 to the output engagement member 265 is disconnected.

The CPU 800, by driving the solenoid 57 via the drive circuit 812*b*, moves the control lever 261. When the solenoid 57 is turned on, the clutch mechanism 260 is turned off. When the solenoid 57 is turned off, the clutch mechanism 260 is turned on.

The target distance Y in the third embodiment is assumed to be longer than the target distance X in the first and second embodiments. This is because variation (equivalent to 0 to 1 tooth) occurs due to the pitch between the cam portion 262*a* and the cam portion 263*a*. Assuming that the variation is d, the target distance Y in the third embodiment is the sum of the target distance X and the variation d (Y=X+d). In the third embodiment, the variation d is absorbed at a timing of starting the writing of the laser beam triggered by the sheet sensor 3*b* detecting the leading end of the sheet P. The pitches of the cam portion 262*a* and the cam portion 263*a* may be designed so that the variation d falls within a range that does not affect the productivity of the image forming apparatus 1. As described above, the clutch mechanism 260 utilizing a cam results in a greater variation compared to the electromagnetic clutch. However, if this variation is allowable for the image forming apparatus 1, it is possible to further reduce the cost of the image forming apparatus 1.

Although the third embodiment is mainly described with respect to the optional paper feed apparatus 10, the clutch mechanism 260 may be employed as the paper feed clutch 61 and the registration clutch 62 of the first and second embodiments. The chain of drives of the conveying roller of the third embodiment is basically assumed to be the same as the chain of drives of the second embodiment. However, in the chain of drives of the third embodiment, the chain of drives may be changed so that a roller to which the driving force is transmitted by one clutch mechanism 260 becomes the conveying roller pair 55 and the outlet roller pair 56.

According to the third embodiment, the rotational speed of the conveying roller pair 55 and the outlet roller pair 56 can be switched to either the first speed V1 or the second speed V2 by the clutch mechanism 260. Further, only when the clutch mechanism 260 is on, the paper feed roller group 20*b* is supplied with the driving force and rotates at the second speed V2. When the clutch mechanism 260 is off, the paper feed roller group 20*b* stops or rotates at the second speed V2 driven by the sheet P because the driving force is not supplied. Thus, in the first to third embodiments, the paper feed roller groups 20*a* and 20*b* have a driving state in which the paper feed roller groups 20*a* and 20*b* rotate by receiving a driving force and a stop state (a driven state) in which the driving force is not supplied. However, this is merely an example. However, if there is a conveying roller having a driving state and a driven state, and a roller which changes in speed in conjunction with a clutch downstream in the direction in which the driving force is transmitted, the technical concept of the first to third embodiments can be applied.

<Technical Concept Derived from Embodiments>

[Aspect 1]

The paper feed roller groups 20*a* and 20*b* are examples of a first conveying roller that conveys sheets. The intermediate conveying roller pair 30 and the conveying roller pair 55 are examples of a second conveying roller disposed on the downstream side of the first conveying roller in the conveyance direction of the sheets. When the second conveying roller rotates at the first speed by a driving force being transmitted to the second conveying roller, the first conveying roller rotates by being driven with respect to the second conveying roller. In other words, the first conveying roller rotates in accordance with/by following the second conveying roller. When the second conveying roller rotates at the second speed faster than the first speed, by a driving force being transmitted to the second conveying roller, the first conveying roller rotates at the second speed. Thus, according to the technical concept derived from the first to third embodiments, it is possible to switch the speed of a plurality of rollers at a lower cost than in the prior art.

[Aspect 2]

A chain of drives including the input gear 65, the branch gear 63, the idler gear 64 and the first drive gear 71 is an example of a first transmission mechanism for transmitting a driving force generated by a motor to the second conveying roller. A chain of drives including the input gear 65, the branch gear 63, the paper feed clutch 61, and the feed gear 67 is an example of a second transmission mechanism that is provided in parallel with respect to the first transmission mechanism and transmits the driving force generated by the motor to the first conveying roller. A chain of drives including the feed gear 67, the idler gear 68, and the second drive gear 72 is an example of a third transmission mechanism for transmitting the driving force transmitted to the second conveying roller via the second transmission mechanism. As described in the first to third embodiments, the second conveying roller may rotate at the first speed. In this case, the first transmission mechanism transmits the driving force generated by the motor to the second conveying roller, so that the second conveying roller rotates at the first speed, and the second transmission mechanism disconnects the driving force generated by the motor. The first conveying roller and the second conveying roller may rotate at the second speed faster than the first speed. In this case, the second transmission mechanism transmits the driving force generated by the motor to the first conveying roller, and the third transmission mechanism further transmits the driving force to the second conveying roller, and the first transmission mechanism does not transmit the driving force generated by the motor to the second conveying roller. Thus, the first conveying roller and the second conveying roller each rotate at the second speed. Thus, according to the technical concept derived from the first to third embodiments, it is possible to switch the speed of a plurality of rollers at a lower cost than in the prior art.

[Aspect 3]

The second transmission mechanism may include a first clutch having a transmissive state for transmitting a driving force and a disconnected state for disconnecting the driving force. Here, the paper feed clutch 61 and the clutch mechanism 260 are examples of the first clutch. The first clutch is controlled to the disconnected state when the second conveying roller is rotated at the first speed and is controlled to the transmissive state when the second conveying roller is rotated at the second speed.

[Aspect 4]

As described in the first and second embodiments, the first clutch may be an electromagnetic clutch. When the electromagnetic clutch is turned on, the first clutch enters the transmissive state. When the electromagnetic clutch is turned off, the first clutch enters the disconnected state. It is possible to switch these speeds only by providing one electromagnetic clutch with respect to the first conveying roller and the second conveying roller in this manner. Therefore, as compared with the prior art in which two electromagnetic clutches are required, the first and second embodiments can reduce cost.

[Aspect 5]

As described in the third embodiment, the first clutch (e.g., the clutch mechanism 260) may have an end cam and a lever that switches the phase of the end cam to a first phase or a second phase. The first clutch enters the transmissive state when the phase of the end cam is controlled to the first phase and enters a disconnected state when the phase of the end cam is controlled to the second phase. It is possible to switch these speeds only by providing the clutch mechanism 260 with respect to the first conveying roller and the second conveying roller in this manner. Therefore, as compared with the prior art in which two electromagnetic clutches are required, the third embodiment can reduce cost.

[Aspects 6 and 7]

The sheet sensors 3*a* to 3*c* are examples of a sensor that detect sheets. The CPU 800 is an example of a control circuit, processor, or processing circuit for controlling the first clutch in response to the result of detection by the sensor. The CPU 800 determines a timing for switching the first clutch from the transmissive state to the disconnected state according to the timing at which the leading end of the subsequent sheet is detected by the sensor so that the distance L from the trailing end of the preceding sheet P1 to the leading end of the subsequent sheet P2 becomes the target distance X or Y. Thus, it becomes possible to control the distance L from the trailing end of the preceding sheet P1 to the leading end of the subsequent sheet P2 to be the target distance X or Y at a low cost.

[Aspect 8]

As described in the first to third embodiments, the first conveying roller may rotate at the first speed driven with respect to the second conveying roller via the sheet conveyed at the first speed by the second conveying roller.

[Aspect 9]

As described in the first example, the first transmission mechanism may include a first gear (e.g., first drive gear 71) that is rotated by a driving force, and a first one-way clutch (one-way clutch 73) provided between the first gear and the rotational shaft of the second conveying roller. The first one-way clutch transmits the driving force inputted to the first gear to the rotational shaft of the second conveying roller to rotate the second conveying roller at the first speed. The first one-way clutch idles the first gear with respect to the rotational shaft of the second conveying roller when the second conveying roller rotates at the second speed. This reduces the number of expensive parts such as electromagnetic clutches.

[Aspect 10]

The third transmission mechanism may include a second one-way clutch (e.g., one-way clutch 74) attached to the second conveying roller. The second one-way clutch does not transmit the driving force transmitted via the first transmission mechanism to the first conveying roller. The second one-way clutch does transmits the driving force transmitted via the second transmission mechanism to the second conveying roller. This reduces the number of expensive parts such as electromagnetic clutches.

[Aspect 11]

As described in the second embodiment, the registration roller 41 is an example of a third conveying roller disposed on the downstream side of the second conveying roller in the conveyance direction of the sheets. A chain of drives including the input gear 65, the branch gear 63, the transmission gear 79, and the first drive gear 81 is an example of a fourth transmission mechanism for transmitting a driving force generated by a motor to the third conveying roller. A chain of drives including the input gear 65, the branch gear 63, the registration clutch 62, and the second drive gear 82 is an example of a fifth transmission mechanism that is provided in parallel with respect to the fourth transmission mechanism and transmits the driving force generated by the motor to the third conveying roller. The third conveying roller rotates at the first speed by the driving force transmitted via the fourth transmission mechanism. The third conveying roller rotates at the second speed by the driving force transmitted via the fifth transmission mechanism.

[Aspect 12]

The registration clutch 62 is an example of a second clutch having a transmissive state for transmitting a driving force and a disconnected state for disconnecting the driving force. The second clutch is controlled to the disconnected state when the third conveying roller is rotated at the first speed and is controlled to the transmissive state when the third conveying roller is rotated at the second speed.

[Aspect 13]

The fourth transmission mechanism may include a second gear (e.g., first drive gear 81) that is rotated by a driving force, and a third one-way clutch (e.g., one-way clutch 83) provided between the second gear and the rotational shaft of the third conveying roller. The third one-way clutch transmits the driving force inputted to the second gear to the rotational shaft of the third conveying roller to rotate the third conveying roller at the first speed. The third one-way clutch idles the second gear with respect to the rotational shaft of the third conveying roller when the third conveying roller rotates at the second speed.

[Aspects 14 and 15]

The sheet conveying apparatus 100 may be integrated in the image forming apparatus 1. The sheet conveying apparatus (e.g., the optional paper feed apparatus 10) may be a detachable sheet conveying apparatus that is attached to the outside of the image forming apparatus 1. In this case, the motor 820 may be provided in the image forming apparatus 1.

[Aspect 16]

The sheet conveying apparatus 100 and the optional paper feed apparatus 10 are examples of a conveying mechanism for conveying sheets. The image forming unit 50 is an example of an image forming mechanism that forms an image on a sheet conveyed by the conveying mechanism.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-023691 filed Feb. 17, 2021 which is hereby incorporated by reference herein in its entirety.

What is claimed is:

1. A sheet conveying apparatus comprising:

a first conveying roller configured to convey a sheet;

a second conveying roller disposed on a downstream side of the first conveying roller in a conveyance direction of the sheet;

a first transmission mechanism configured to transmit a driving force generated by the motor to the second conveying roller;

a second transmission mechanism provided parallel to the first transmission mechanism and configured to transmit the driving force to the first conveying roller; and a third transmission mechanism configured (i) to transmit the driving force transmitted via the second transmission mechanism to the second conveying roller and (ii) not to transmit the driving force transmitted via the first transmission mechanism to the first conveying roller, wherein in a case where the second conveying roller rotates at a first speed by the first transmission mechanism transmitting the driving force to the second conveying roller, the second transmission mechanism and the third transmission mechanism do not transmit the driving force to the first conveying roller and the first conveying roller rotates by being driven with respect to the second conveying roller, and in a case where the second conveying roller rotates at a second speed faster than the first speed by the third transmission mechanism transmitting the driving force transmitted via the second transmission mechanism to the second conveying roller, the first conveying roller rotates at the second speed by the second transmission mechanism transmitting the driving force to the first conveying roller.

2. The sheet conveying apparatus according to claim 1, wherein the second transmission mechanism includes a first clutch having a transmissive state for transmitting the driving force and a disconnected state for disconnecting the driving force, and the first clutch is controlled to the disconnected state when the second conveying roller is rotated at the first speed and is controlled to the transmissive state when the second conveying roller is rotated at the second speed.

3. The sheet conveying apparatus according to claim 2, wherein the first clutch is an electromagnetic clutch, when the electromagnetic clutch is turned on, the first clutch enters the transmissive state, and when the electromagnetic clutch is turned off, the first clutch enters the disconnected state.

4. The sheet conveying apparatus according to claim 2, wherein the first clutch includes an end cam and a lever that switches a phase of the end cam to a first phase or a second phase, and the first clutch enters the transmissive state upon the phase of the end cam being controlled to the first phase and enters the disconnected state upon the phase of the end cam being controlled to the second phase.

5. The sheet conveying apparatus according to claim 2, further comprising:

a sensor configured to detect a sheet; and a processing circuit configured to control the first clutch in accordance with a result of detection by the sensor.

6. The sheet conveying apparatus according to claim 5, wherein the processing circuit determines a timing at which to switch the first clutch from the transmissive state to the disconnected state in accordance with a timing at which a leading end of a subsequent sheet has been detected by the sensor such that a distance from a trailing end of a preceding sheet to the leading end of the subsequent sheet is a target distance.

7. The sheet conveying apparatus according to claim 1, wherein the first conveying roller rotates at the first speed by being driven with respect to the second conveying roller via a sheet conveyed at the first speed by the second conveying roller.

8. The sheet conveying apparatus according to claim 7, wherein the first transmission mechanism includes a first gear that is rotated by the driving force and a first one-way clutch provided between the first gear and a rotational shaft of the second conveying roller, and the first one-way clutch:

in a case where the second conveying roller rotates at the first speed, causes the second conveying roller to rotate at the first speed by transmitting a driving force inputted to the first gear to the rotational shaft of the second conveying roller; and in a case where the second conveying roller rotates at the second speed, causes the first gear to idle with respect to the rotational shaft of the second conveying roller.

9. The sheet conveying apparatus according to claim 8, wherein the third transmission mechanism includes a second one-way clutch attached to the second conveying roller, and the second one-way clutch does not transmit a driving force transmitted via the first transmission mechanism to the first conveying roller and transmits a driving force transmitted via the second transmission mechanism to the second conveying roller.

10. The sheet conveying apparatus according to claim 1, further comprising:

a third conveying roller disposed on a downstream side of the second conveying roller in a conveyance direction of the sheet;

a fourth transmission mechanism configured to convey the driving force to the third conveying roller; and a fifth transmission mechanism provided parallel to the fourth transmission mechanism and configured to transmit the driving force to the third conveying roller;

wherein the third conveying roller, in a case of rotating at the first speed, is rotated at the first speed by a driving force transmitted via the fourth transmission mechanism, and the third conveying roller, in a case of rotating at the second speed, is rotated at the second speed by a driving force transmitted via the fifth transmission mechanism.

11. The sheet conveying apparatus according to claim 10, wherein the fifth transmission mechanism includes a second clutch having a transmissive state for transmitting the driving force and a disconnected state for disconnecting the driving force, and the second clutch is controlled to the disconnected state when the third conveying roller is rotated at the first speed and is controlled to the transmissive state when the third conveying roller is rotated at the second speed.

12. The sheet conveying apparatus according to claim 11, wherein the fourth transmission mechanism includes a second gear that is rotated by the driving force and a third one-way clutch provided between the second gear and a rotational shaft of the third conveying roller, and the third one-way clutch in a case where the third conveying roller rotates at the first speed, causes the third conveying roller to rotate at the first speed by transmitting a driving force inputted to the second gear to the rotational shaft of the third conveying roller, and in a case where the third conveying roller rotates at the second speed, causes the second gear to idle with respect to the rotational shaft of the third conveying roller.

13. The sheet conveying apparatus according to claim 1, wherein the sheet conveying apparatus is integrated in an image forming apparatus.

14. The sheet conveying apparatus according to claim 1, wherein the sheet conveying apparatus is a detachable sheet conveying apparatus that is attached outside of the image forming apparatus, and the motor is provided in the image forming apparatus.

15. An image forming apparatus comprising:

a conveying mechanism configured to convey a sheet; and an image forming mechanism configured to form an image on the sheet conveyed by the conveying mechanism, the conveying mechanism comprising:

a first conveying roller configured to convey a sheet; and a second conveying roller disposed on a downstream side of the first conveying roller in a conveyance direction of the sheet;

a first transmission mechanism configured to transmit a driving force generated by the motor to the second conveying roller;

a second transmission mechanism provided parallel to the first transmission mechanism and configured to transmit the driving force to the first conveying roller; and a third transmission mechanism configured (i) to transmit the driving force transmitted via the second transmission mechanism to the second conveying roller and (ii) not to transmit the driving force transmitted via the first transmission mechanism to the first conveying roller, wherein in a case where the second conveying roller rotates at a first speed by the first transmission mechanism transmitting the driving force to the second conveying roller, the second transmission mechanism and the third transmission mechanism do not transmit the driving force to the first conveying roller and the first conveying roller rotates by being driven with respect to the second conveying roller, and in a case where the second conveying roller rotates at a second speed faster than the first speed by the third transmission mechanism transmitting the driving force transmitted via the second transmission mechanism to the second conveying roller, the first conveying roller rotates at the second speed by the second transmission mechanism transmitting the driving force to the first conveying roller.

* * * * *